United States Patent
Artes et al.

(10) Patent No.: US 11,709,489 B2
(45) Date of Patent: Jul. 25, 2023

(54) METHOD FOR CONTROLLING AN AUTONOMOUS, MOBILE ROBOT

(71) Applicant: Robart GmbH, Linz (AT)

(72) Inventors: Harold Artes, Linz (AT); David Conti, Linz (AT); Christoph Freudenthaler, Linz (AT); Dominik Seethaler, Linz (AT); Reinhard Vogel, Linz (AT)

(73) Assignee: Robart GmbH, Linz (AT)

( * ) Notice: Subject to any disclaimer, the term of this patent is extended or adjusted under 35 U.S.C. 154(b) by 486 days.

(21) Appl. No.: 16/490,271

(22) PCT Filed: Feb. 27, 2018

(86) PCT No.: PCT/EP2018/054807
§ 371 (c)(1),
(2) Date: Jan. 6, 2020

(87) PCT Pub. No.: WO2018/158248
PCT Pub. Date: Sep. 7, 2018

(65) Prior Publication Data
US 2020/0150655 A1    May 14, 2020

(30) Foreign Application Priority Data

Mar. 2, 2017  (DE) ............ 10 2017 104 427.2
Mar. 2, 2017  (DE) ............ 10 2017 104 428.0

(51) Int. Cl.
*G05D 1/00*    (2006.01)
*B60W 60/00*   (2020.01)
*G05D 1/02*    (2020.01)

(52) U.S. Cl.
CPC ....... *G05D 1/0088* (2013.01); *B60W 60/0015* (2020.02); *G05D 1/0214* (2013.01);
(Continued)

(58) Field of Classification Search
CPC .. G05D 1/0088; G05D 1/0214; G05D 1/0219; G05D 1/0274; G05D 2201/0203;
(Continued)

(56) References Cited

U.S. PATENT DOCUMENTS

| 4,674,048 A | 6/1987 | Okumura |
| 4,740,676 A | 4/1988 | Satoh et al. |

(Continued)

FOREIGN PATENT DOCUMENTS

| AU | 2015322263 | 4/2017 |
| CA | 2322419 | 9/1999 |

(Continued)

OTHER PUBLICATIONS

Choset et al., "Principles of Robot Motion", Theory, Algorithms, and Implementations, Chapter 6—Cell decompositions, 2004, document of 41 pages.

(Continued)

*Primary Examiner* — Ryan Rink
(74) *Attorney, Agent, or Firm* — Akerman LLP; Peter A. Chiabotti

(57) ABSTRACT

A method for controlling an autonomous, mobile robot which is designed to navigate independently in a robot deployment area, using sensors and a map. According to one embodiment, the method comprises detecting obstacles and calculating the position of detected obstacles based on measurement data received by the sensors, and controlling the robot to avoid a collision with a detected obstacle, the map comprising map data that represents at least one virtual blocked region which, during the control of the robot, is taken into account in the same way as an actual, detected obstacle.

11 Claims, 4 Drawing Sheets

(52) U.S. Cl.
CPC ......... *G05D 1/0219* (2013.01); *G05D 1/0274* (2013.01); *G05D 2201/0203* (2013.01); *G05D 2201/0215* (2013.01)

(58) Field of Classification Search
CPC ......... G05D 2201/0215; G05D 1/0044; G05D 1/0016; B60W 60/0015
See application file for complete search history.

(56) References Cited

U.S. PATENT DOCUMENTS

| | | |
|---|---|---|
| 4,777,416 A | 10/1988 | George, II et al. |
| 5,109,566 A | 5/1992 | Kobayashi et al. |
| 5,260,710 A | 11/1993 | Omamyuda et al. |
| 5,284,522 A | 2/1994 | Kobayashi et al. |
| 5,377,106 A | 12/1994 | Drunk et al. |
| 5,402,051 A | 3/1995 | Fujiwara et al. |
| 5,696,675 A | 12/1997 | Nakamura et al. |
| 5,787,545 A | 8/1998 | Colens |
| 5,995,884 A | 11/1999 | Allen et al. |
| 6,366,219 B1 | 4/2002 | Hoummady |
| 6,389,329 B1 | 5/2002 | Colens |
| 6,532,404 B2 | 3/2003 | Colens |
| 6,594,844 B2 | 7/2003 | Jones |
| 6,605,156 B1 | 8/2003 | Clark et al. |
| 6,615,108 B1 | 9/2003 | Peless et al. |
| 6,667,592 B2 | 12/2003 | Jacobs et al. |
| 6,690,134 B1 | 2/2004 | Jones et al. |
| 6,764,373 B1 | 7/2004 | Osawa et al. |
| 6,781,338 B2 | 8/2004 | Jones et al. |
| 6,809,490 B2 | 10/2004 | Jones et al. |
| 6,965,209 B2 | 11/2005 | Jones et al. |
| 6,972,834 B1 | 12/2005 | Oka et al. |
| 7,155,308 B2 | 12/2006 | Jones |
| 7,173,391 B2 | 2/2007 | Jones et al. |
| 7,196,487 B2 | 3/2007 | Jones et al. |
| 7,302,345 B2 | 11/2007 | Kwon et al. |
| 7,388,343 B2 | 6/2008 | Jones et al. |
| 7,389,156 B2 | 6/2008 | Ziegler et al. |
| 7,448,113 B2 | 11/2008 | Jones et al. |
| 7,483,151 B2 | 1/2009 | Zganec et al. |
| 7,507,948 B2 | 3/2009 | Park et al. |
| 7,539,557 B2 | 5/2009 | Yamauchi |
| 7,571,511 B2 | 8/2009 | Jones et al. |
| 7,636,982 B2 | 12/2009 | Jones et al. |
| 7,656,541 B2 | 2/2010 | Waslowski et al. |
| 7,761,954 B2 | 7/2010 | Ziegler et al. |
| 7,801,676 B2 | 9/2010 | Kurosawa et al. |
| 8,438,695 B2 | 5/2013 | Gilbert et al. |
| 8,594,019 B2 | 11/2013 | Misumi |
| 8,739,355 B2 | 6/2014 | Morse et al. |
| 8,855,914 B1 | 10/2014 | Alexander et al. |
| 8,892,251 B1 | 11/2014 | Dooley et al. |
| 8,921,752 B2 | 12/2014 | Iizuka |
| 8,982,217 B1 | 3/2015 | Hickman |
| 9,002,511 B1 | 4/2015 | Hickerson et al. |
| 9,026,302 B2 | 5/2015 | Stout et al. |
| 9,037,294 B2 | 5/2015 | Chung et al. |
| 9,043,017 B2 | 5/2015 | Jung et al. |
| 9,149,170 B2 | 10/2015 | Ozick et al. |
| 9,220,386 B2 | 12/2015 | Gilbert, Jr. et al. |
| 9,486,924 B2 | 11/2016 | Dubrovsky et al. |
| 9,717,387 B1 | 8/2017 | Szatmary et al. |
| 10,228,697 B2 | 3/2019 | Yoshino |
| 10,845,817 B1* | 11/2020 | Ebrahimi Afrouzi .. G05D 1/024 |
| 2002/0016649 A1 | 2/2002 | Jones |
| 2002/0103575 A1 | 8/2002 | Sugawara |
| 2002/0120364 A1 | 8/2002 | Colens |
| 2003/0025472 A1 | 2/2003 | Jones et al. |
| 2003/0030398 A1 | 2/2003 | Jacobs et al. |
| 2003/0120389 A1 | 6/2003 | Abramson |
| 2003/0142925 A1 | 7/2003 | Melchior et al. |
| 2004/0020000 A1 | 2/2004 | Jones |
| 2004/0049877 A1 | 3/2004 | Jones et al. |
| 2004/0187457 A1 | 9/2004 | Colens |
| 2004/0207355 A1 | 10/2004 | Jones et al. |
| 2005/0000543 A1 | 1/2005 | Taylor et al. |
| 2005/0010331 A1 | 1/2005 | Taylor et al. |
| 2005/0041839 A1 | 2/2005 | Saitou et al. |
| 2005/0067994 A1 | 3/2005 | Jones et al. |
| 2005/0156562 A1 | 7/2005 | Cohen et al. |
| 2005/0171636 A1 | 8/2005 | Tani |
| 2005/0171644 A1 | 8/2005 | Tani |
| 2005/0204717 A1 | 9/2005 | Colens |
| 2005/0212680 A1 | 9/2005 | Uehigashi |
| 2005/0229338 A1 | 10/2005 | Kashiwagi |
| 2005/0256610 A1 | 11/2005 | Orita |
| 2006/0020369 A1 | 1/2006 | Taylor et al. |
| 2006/0095158 A1 | 5/2006 | Lee et al. |
| 2006/0237634 A1 | 10/2006 | Kim |
| 2007/0027579 A1 | 2/2007 | Suzuki et al. |
| 2007/0061041 A1 | 3/2007 | Zweig |
| 2007/0234492 A1 | 10/2007 | Svendsen et al. |
| 2007/0266508 A1 | 11/2007 | Jones et al. |
| 2007/0282484 A1 | 12/2007 | Chung et al. |
| 2008/0046125 A1 | 2/2008 | Myeong et al. |
| 2008/0140255 A1 | 6/2008 | Ziegler et al. |
| 2008/0155768 A1 | 7/2008 | Ziegler et al. |
| 2008/0192256 A1 | 8/2008 | Wolf et al. |
| 2008/0307590 A1 | 12/2008 | Jones et al. |
| 2009/0048727 A1 | 2/2009 | Hong et al. |
| 2009/0051921 A1 | 2/2009 | Masahiko |
| 2009/0177320 A1 | 7/2009 | Lee et al. |
| 2009/0182464 A1 | 7/2009 | Myeong et al. |
| 2009/0281661 A1 | 11/2009 | Dooley et al. |
| 2010/0030380 A1 | 2/2010 | Shah et al. |
| 2010/0049365 A1 | 2/2010 | Jones et al. |
| 2010/0082193 A1 | 4/2010 | Chiappetta |
| 2010/0257690 A1 | 10/2010 | Jones et al. |
| 2010/0257691 A1 | 10/2010 | Jones et al. |
| 2010/0263158 A1 | 10/2010 | Jones et al. |
| 2010/0324731 A1 | 12/2010 | Letsky |
| 2010/0324736 A1 | 12/2010 | Yoo et al. |
| 2011/0054689 A1* | 3/2011 | Nielsen ................ G05D 1/0088 700/258 |
| 2011/0137461 A1 | 6/2011 | Kong et al. |
| 2011/0194755 A1 | 8/2011 | Jeong et al. |
| 2011/0211731 A1 | 9/2011 | Lee et al. |
| 2011/0224824 A1 | 9/2011 | Lee et al. |
| 2011/0236026 A1 | 9/2011 | Yoo et al. |
| 2011/0238214 A1 | 9/2011 | Yoo et al. |
| 2011/0264305 A1 | 10/2011 | Choe et al. |
| 2011/0278082 A1 | 11/2011 | Chung et al. |
| 2011/0295420 A1 | 12/2011 | Wagner |
| 2011/0295423 A1* | 12/2011 | Anderson ............ G05D 1/0088 701/26 |
| 2012/0008128 A1 | 1/2012 | Bamji |
| 2012/0013907 A1 | 1/2012 | Jung et al. |
| 2012/0022785 A1 | 1/2012 | DiBernardo et al. |
| 2012/0060320 A1 | 3/2012 | Lee et al. |
| 2012/0069457 A1 | 3/2012 | Wolf et al. |
| 2012/0169497 A1 | 7/2012 | Schnittman et al. |
| 2012/0173070 A1 | 7/2012 | Schnittman |
| 2012/0215380 A1 | 8/2012 | Fouillade et al. |
| 2012/0223216 A1 | 9/2012 | Flaherty et al. |
| 2012/0265370 A1 | 10/2012 | Kim et al. |
| 2012/0271502 A1 | 10/2012 | Lee |
| 2012/0283905 A1* | 11/2012 | Nakano ................ G05D 1/0238 701/25 |
| 2013/0001398 A1 | 1/2013 | Wada et al. |
| 2013/0024025 A1 | 1/2013 | Hsu |
| 2013/0166134 A1 | 6/2013 | Shitamoto et al. |
| 2013/0206177 A1 | 8/2013 | Burlutskiy |
| 2013/0217421 A1 | 8/2013 | Kim |
| 2013/0221908 A1 | 8/2013 | Tang |
| 2013/0261867 A1 | 10/2013 | Burnett et al. |
| 2013/0265562 A1 | 10/2013 | Tang et al. |
| 2013/0302132 A1* | 11/2013 | D'Andrea ............ G05D 1/0297 414/807 |
| 2013/0317944 A1 | 11/2013 | Huang et al. |
| 2014/0005933 A1 | 1/2014 | Fong et al. |
| 2014/0098218 A1 | 4/2014 | Wu et al. |
| 2014/0100693 A1 | 4/2014 | Fong et al. |
| 2014/0115797 A1 | 5/2014 | Duenne |

(56) References Cited

U.S. PATENT DOCUMENTS

| | | | |
|---|---|---|---|
| 2014/0124004 A1 | 5/2014 | Rosenstein et al. | |
| 2014/0128093 A1 | 5/2014 | Das et al. | |
| 2014/0156125 A1 | 6/2014 | Song et al. | |
| 2014/0207280 A1* | 7/2014 | Duffley | A47L 11/4011 700/257 |
| 2014/0207281 A1 | 7/2014 | Angle et al. | |
| 2014/0207282 A1 | 7/2014 | Angle et al. | |
| 2014/0218517 A1 | 8/2014 | Kim et al. | |
| 2014/0257563 A1 | 9/2014 | Park et al. | |
| 2014/0257564 A1 | 9/2014 | Sun et al. | |
| 2014/0257565 A1 | 9/2014 | Sun et al. | |
| 2014/0303775 A1 | 10/2014 | Oh et al. | |
| 2014/0316636 A1* | 10/2014 | Hong | G05D 1/0274 901/1 |
| 2014/0324270 A1 | 10/2014 | Chan et al. | |
| 2014/0343783 A1 | 11/2014 | Lee | |
| 2015/0115138 A1 | 4/2015 | Heng et al. | |
| 2015/0115876 A1 | 4/2015 | Noh et al. | |
| 2015/0120056 A1 | 4/2015 | Noh et al. | |
| 2015/0151646 A1 | 6/2015 | Noiri | |
| 2015/0168954 A1 | 6/2015 | Hickerson et al. | |
| 2015/0173578 A1 | 6/2015 | Kim et al. | |
| 2015/0202772 A1 | 7/2015 | Kim | |
| 2015/0212520 A1 | 7/2015 | Artes et al. | |
| 2015/0223659 A1 | 8/2015 | Han et al. | |
| 2015/0260829 A1 | 9/2015 | Wada | |
| 2015/0265125 A1 | 9/2015 | Lee et al. | |
| 2015/0314453 A1 | 11/2015 | Witelson et al. | |
| 2015/0367513 A1 | 12/2015 | Gettings et al. | |
| 2016/0008982 A1 | 1/2016 | Artes et al. | |
| 2016/0026185 A1* | 1/2016 | Smith | G05D 1/0231 356/614 |
| 2016/0037983 A1 | 2/2016 | Hillen et al. | |
| 2016/0041029 A1 | 2/2016 | T'ng et al. | |
| 2016/0066759 A1 | 3/2016 | Langhammer et al. | |
| 2016/0103451 A1 | 4/2016 | Vicenti | |
| 2016/0132056 A1 | 5/2016 | Yoshino | |
| 2016/0150933 A1 | 6/2016 | Duenne et al. | |
| 2016/0165795 A1 | 6/2016 | Balutis et al. | |
| 2016/0166126 A1 | 6/2016 | Morin et al. | |
| 2016/0209217 A1 | 7/2016 | Babu et al. | |
| 2016/0213218 A1 | 7/2016 | Ham et al. | |
| 2016/0214258 A1* | 7/2016 | Yan | B25J 9/1694 |
| 2016/0500161 | 7/2016 | Van Den Bossche et al. | |
| 2016/0229060 A1 | 8/2016 | Kim et al. | |
| 2016/0271795 A1 | 9/2016 | Vicenti | |
| 2016/0282866 A1 | 9/2016 | Yamamura et al. | |
| 2016/0282873 A1 | 9/2016 | Masaki et al. | |
| 2016/0297072 A1* | 10/2016 | Williams | B25J 9/1697 |
| 2016/0298970 A1 | 10/2016 | Lindhe et al. | |
| 2016/0335497 A1 | 11/2016 | Williams et al. | |
| 2017/0001311 A1 | 1/2017 | Bushman et al. | |
| 2017/0083022 A1 | 3/2017 | Tang | |
| 2017/0147000 A1 | 5/2017 | Hoennige et al. | |
| 2017/0177001 A1 | 6/2017 | Cao et al. | |
| 2017/0197314 A1 | 7/2017 | Stout et al. | |
| 2017/0231452 A1 | 8/2017 | Saito et al. | |
| 2017/0364087 A1 | 12/2017 | Tang et al. | |
| 2018/0004217 A1* | 1/2018 | Biber | G05D 1/0221 |
| 2018/0074508 A1* | 3/2018 | Kleiner | A47L 9/2857 |
| 2020/0348666 A1* | 11/2020 | Han | A47L 9/2805 |
| 2021/0161100 A1* | 6/2021 | Devaney, II | A01K 15/02 |

FOREIGN PATENT DOCUMENTS

| | | |
|---|---|---|
| CN | 1381340 | 11/2002 |
| CN | 1696612 | 11/2005 |
| CN | 101945325 | 1/2011 |
| CN | 101972129 | 2/2011 |
| CN | 102356367 A | 2/2012 |
| CN | 102407522 | 4/2012 |
| CN | 102738862 | 10/2012 |
| CN | 202540304 U | 11/2012 |
| CN | 103699123 A | 4/2014 |
| CN | 203672362 | 6/2014 |
| CN | 104460663 | 3/2015 |
| CN | 104634601 | 5/2015 |
| CN | 104765362 | 7/2015 |
| CN | 105045098 | 11/2015 |
| CN | 105334847 | 2/2016 |
| CN | 105425801 A | 3/2016 |
| CN | 105467398 | 4/2016 |
| CN | 105527619 | 4/2016 |
| CN | 105990876 | 10/2016 |
| DE | 4421805 | 8/1995 |
| DE | 10204223 | 8/2003 |
| DE | 10261787 | 1/2004 |
| DE | 60002209 | 3/2004 |
| DE | 69913150 | 8/2004 |
| DE | 102007016802 | 5/2008 |
| DE | 102008028931 | 6/2008 |
| DE | 102008014912 | 9/2009 |
| DE | 102009059217 | 2/2011 |
| DE | 102009041362 | 3/2011 |
| DE | 102009052629 | 5/2011 |
| DE | 102010000174 | 7/2011 |
| DE | 102010000317 | 8/2011 |
| DE | 102010000607 | 9/2011 |
| DE | 102010017211 | 12/2011 |
| DE | 102010017689 | 1/2012 |
| DE | 102010033768 | 2/2012 |
| DE | 102011050357 | 2/2012 |
| DE | 102012201870 | 8/2012 |
| DE | 102011006062 | 9/2012 |
| DE | 102011051729 | 1/2013 |
| DE | 102012211071 | 11/2013 |
| DE | 102012105608 | 1/2014 |
| DE | 102012109004 | 3/2014 |
| DE | 202014100346 | 3/2014 |
| DE | 102012112035 | 6/2014 |
| DE | 102012112036 | 6/2014 |
| DE | 102013100192 | 7/2014 |
| DE | 102014110265 | 7/2014 |
| DE | 102014113040 | 9/2014 |
| DE | 102013104399 | 10/2014 |
| DE | 102013104547 | 11/2014 |
| DE | 102015006014 | 5/2015 |
| DE | 102014012811 | 10/2015 |
| DE | 102015119501 | 11/2015 |
| DE | 102014110104 | 1/2016 |
| DE | 102016102644 | 2/2016 |
| EP | 142594 | 5/1985 |
| EP | 402764 | 12/1990 |
| EP | 0769923 | 5/1997 |
| EP | 1062524 | 12/2000 |
| EP | 1342984 | 9/2003 |
| EP | 1533629 | 5/2005 |
| EP | 1553536 | 7/2005 |
| EP | 1557730 | 7/2005 |
| EP | 1621948 | 2/2006 |
| EP | 1942313 | 7/2008 |
| EP | 1947477 | 7/2008 |
| EP | 1983396 | 10/2008 |
| EP | 2027806 | 2/2009 |
| EP | 2053417 | 4/2009 |
| EP | 2078996 | 7/2009 |
| EP | 2287697 | 2/2011 |
| EP | 2327957 | 6/2011 |
| EP | 1941411 | 9/2011 |
| EP | 2407847 | 1/2012 |
| EP | 2450762 | 5/2012 |
| EP | 2457486 | 5/2012 |
| EP | 2498158 | 9/2012 |
| EP | 2502539 | 9/2012 |
| EP | 2511782 | 10/2012 |
| EP | 2515196 | 10/2012 |
| EP | 2573639 | 3/2013 |
| EP | 2595024 | 5/2013 |
| EP | 2740013 | 6/2014 |
| EP | 2741159 | 6/2014 |
| EP | 2853976 | 4/2015 |
| EP | 2870852 | 5/2015 |
| EP | 3079030 | 11/2015 |

(56) References Cited

FOREIGN PATENT DOCUMENTS

| | | |
|---|---|---|
| EP | 3156873 | 4/2017 |
| EP | 3184013 | 6/2017 |
| GB | 2509989 | 7/2014 |
| GB | 2509990 | 7/2014 |
| GB | 2509991 | 7/2014 |
| GB | 2513912 | 11/2014 |
| JP | H04338433 | 11/1992 |
| JP | 2001125641 | 5/2001 |
| JP | 2002085305 | 3/2002 |
| JP | 2003330543 | 11/2003 |
| JP | 2004133882 | 4/2004 |
| JP | 2005124753 | 5/2005 |
| JP | 2005205028 | 8/2005 |
| JP | 2005304553 | 11/2005 |
| JP | 2009238055 | 10/2009 |
| JP | 2010227894 | 10/2010 |
| JP | 2011175393 | 9/2011 |
| JP | 2013077088 | 4/2013 |
| JP | 2013146302 | 8/2013 |
| JP | 2014176260 | 9/2014 |
| JP | 201541203 | 3/2015 |
| JP | 2016087106 | 5/2016 |
| JP | 2016186748 | 10/2016 |
| KR | 100735565 | 5/2006 |
| KR | 100815545 | 3/2008 |
| KR | 20110092158 | 8/2011 |
| KR | 20140073854 | 6/2014 |
| KR | 20140145648 | 12/2014 |
| KR | 20150009413 | 1/2015 |
| KR | 20150050161 | 5/2015 |
| KR | 20150086075 | 7/2015 |
| KR | 20150124011 | 11/2015 |
| KR | 20150124013 | 11/2015 |
| KR | 20150124014 | 11/2015 |
| KR | 20150127937 | 11/2015 |
| KR | 101640706 | 7/2016 |
| KR | 20160097051 | 8/2016 |
| WO | 9523346 | 8/1995 |
| WO | 9928800 | 6/1999 |
| WO | 200004430 | 1/2000 |
| WO | 2005074362 | 8/2005 |
| WO | 2007028667 | 3/2007 |
| WO | 2012099694 | 7/2012 |
| WO | 2012157951 | 11/2012 |
| WO | 2013116887 | 8/2013 |
| WO | 2014017256 | 1/2014 |
| WO | 2014043732 | 3/2014 |
| WO | 2014055966 | 4/2014 |
| WO | 2014113091 | 7/2014 |
| WO | 2014138472 | 9/2014 |
| WO | 2015018437 | 2/2015 |
| WO | 2015025599 | 2/2015 |
| WO | 2015072897 | 5/2015 |
| WO | 2015082017 | 6/2015 |
| WO | 2015090398 | 6/2015 |
| WO | 2015158240 | 10/2015 |
| WO | 2015181995 | 12/2015 |
| WO | 2016019996 | 2/2016 |
| WO | 2016027957 | 2/2016 |
| WO | 2016028021 | 2/2016 |
| WO | 2016031702 | 3/2016 |
| WO | 2016048077 | 3/2016 |
| WO | 2016050215 | 4/2016 |
| WO | 2016091312 | 6/2016 |
| WO | 2016095966 | 6/2016 |

OTHER PUBLICATIONS

Durrant-Whyte et al., "Simultaneous Localization and Mapping (SLAM): Part I the Essential Algorithms", in: IEEE Robotics and Automation Magazine, vol. 13, No. 2, pp. 99-108, Jun. 2006.

Kim et al., "User-Centered Approach to Path Planning of Cleaning Robots: Analyzing User's Cleaning Behavior." Proceedings of the 2007 ACM/IEEE Conference on Human-Robot Interaction, Mar. 8-11, 2007, pp. 373-380.

Konolige et al., "A Low-Cost Laser Distance Sensor," 2008 IEEE International Conference on Robotics and Automation, Pasadena, CA, USA, May 19-23, 2008, document of 7 pages.

Oh et al., "Autonomous Battery Recharging for Indoor Mobile Robots," Massachusetts Institute of Technology Press, Aug. 30, 2000, document of 6 pages, XP055321836.

Siegwart, "Introduction to Autonomous Mobile Robots", Massachusetts, ISBN 978-0-26-219502-7, (2004), pp. 104-115, 151-163, 250-251, document of 37 pages. http://www.robotee.com/EBooks/Introduction_to_Autonomous_Mobile_Robots.pdf, XP055054850.

Lymberopoulos et al., "A Realistic Evaluation and Comparison of Indoor Location Technologies: Experiences and Lessons Learned," IPSN '15, Apr. 14-16, 2015, Seattle, WA USA, document of 12 pages. http://dx.doi.org/10.1145/2737095.27.

Neto et al., Human-Machine Interface Based on Electro-Biological Signals for Mobile Vehicles, 2006, IEEE, p. 2954-2959 (Year: 2006).

Forlizzi, How robotic products become social products: An ethnographic study of cleaning in the home, 2007, IEEE, p. 129-136 (Year: 2007).

German Patent Office, "Office Action" issued in German Patent Application No. 10 2017 104 427.2, dated Oct. 27, 2017, document of 8 pages.

World Intellectual Property Office, "International Search Report" and English translation thereof, issued in International Application No. PCT/EP2018/054807, document of 9 pages, dated Nov. 1, 2018.

World Intellectual Property Office, "Written Opinion of the International Searching Authority" and English translation, issued in International Application No. PCT/ EP2018/054807, by European Searching Authority, document of 22 pages, dated Oct. 15, 2018.

Mahyuddin et al., "Neuro-fuzzy algorithm implemented in Altera's FPGA for mobile robot's obstacle avoidance mission", TENCON 2009—2009 IEEE Region 10 Conference, IEEE, Piscataway, NJ, USA, Jan. 23, 2009; document of 6 pages.

Sick Sensor Intelligence, "LMS200/211/221/291 Laser Measurement Systems", Jan. 2007, pp. 1-48, XP055581229, http://sicktoolbox.sourceforge.net/docs/sick-lms-technical-description.pdf.

Japanese Patent Office, "Notice of Reasons for Rejection" issued in Japanese Patent Application No. 2019-547460, dated Aug. 23, 2022, document of 10 pages.

China National Intellectual Property Administration, "First Office Action" issued in Chinese Patent Application No. 018800292237, dated Mar. 24, 2023, document of 10 pages, with translation.

\* cited by examiner

METHOD FOR CONTROLLING AN AUTONOMOUS, MOBILE ROBOT

CROSS REFERENCE TO RELATED APPLICATIONS

This application is a National Phase Application of international patent application no. PCT/AT2016/060110 designating the United States, filed Feb. 27, 2018, which claims priority to German Patent Application No. DE 10 2017 104 427.2, filed Mar. 2, 2017 the entirety of which is herein incorporated by reference.

TECHNICAL FIELD

The disclosure relates to the field of autonomous mobile robots, in particular to the safe operation of an autonomous mobile robot.

BACKGROUND

In recent years, autonomous mobile robots, in particular service robots, are being increasingly used in private homes. They can be employed, for example, as cleaning robots to vacuum and/or sweep a floor surface or as monitoring robots that detect possible dangers such as burglars or fire during inspection runs.

One essential demand placed on the robot by the user consists, e.g. in the robot being able to access all important regions of its area of deployment so that it can carry out its task. Depending on the respective application, it may be of advantage to block access of the robot to certain regions. For example, it may be desirable for the robot to avoid an area, e.g. such as a children's play corner that contains small objects that may interfere with the robot's movement or that may be damaged by the robot.

Known solutions make it possible for the user to place a marker in the robot's area of deployment that the robot can detect using a sensor; a marker that indicates to the robot that it is prohibited to enter the area. One example of such a marker is a kind of "lighthouse" that emits an infrared signal. This solution, however, depends on having its own power supply (e.g. a battery), which may put limits on its reliability. Furthermore, the infrared signal has to be precisely aligned and it has a limited range. A further example are magnet strips that are laid out on or attached to the floor surface and that can be detected by the robot; when the robot detects a magnetic strip it does not move over it. All of these auxiliary means suffer the disadvantage of limiting the user's freedom to arrange his/her living space as desired and are very inflexible.

In the case of autonomous mobile robots that store and maintain a map of their area of deployment in order to use it during their subsequent deployment, a virtual exclusion region can be entered directly into the map. Such a exclusion region may be delineated, for example, by a virtual boundary over which the robot is prohibited from moving. The advantage provided by this purely virtual prohibited are is that no additional markings are needed in the environment of the robot. User error, however, or measurement or movement errors caused by the robot may lead to the robot finding itself in an area that the user had actually intended to prohibit the robot from entering and this may cause unintended damage. In addition, it is needed to be able to enter a virtual exclusion region into the map in as simple and understandable a way as possible.

The present disclosure relates to rendering the operation of an autonomous mobile robot and, in particular, the handling of the exclusion region, more simple and robust.

SUMMARY

Described is a method for controlling an autonomous mobile robot that is configured to independently navigate in an area of robot deployment using sensors and a map. In accordance with one embodiment, the method comprises detecting obstacles and determining the position of the detected obstacles based on the measurement data obtained by the sensors and controlling the robot to avoid a collision with the detected obstacle, wherein the map comprises map data representing at least one virtual exclusion region that is taken into consideration by the robot in the same manner in which a real detected obstacle is.

Further described is a method for controlling an autonomous mobile robot that is configured to independently navigate in an area of robot deployment using sensors and a map, wherein the map comprises at least one virtual boundary line with an orientation that allows to distinguish a first side and a second side of the boundary line. When navigating the robot moving over the boundary line in a first direction—coming from the first side of the boundary line— is avoided, whereas moving over the boundary line in a second direction—coming from the second side of the boundary line—is permitted.

Still further described is a method for controlling an autonomous mobile robot that is configured to independently navigate in an area of robot deployment using sensors and an electronic map, wherein the robot regularly determines its position on the map and the map may comprise at least one virtual exclusion region. In accordance with one embodiment the method comprises testing, based on specifiable criteria, whether an exclusion region is active or inactive, wherein the robot only takes into consideration an active exclusion region and consequently does not move into it.

In accordance with a further embodiment the method comprises receiving data from a further robot via a communication link, wherein the data represent a virtual exclusion region and storing a virtual exclusion region in the map of the robot based on the received data.

Further described is a system that includes an autonomous mobile robot and an external device. In accordance with one embodiment, the robot is configured to independently navigate in its environment using map data, to detect a situation from which it cannot liberate itself autonomously and to set a status of the robot dependent on this detection. The external device is configured to retrieve the status of the robot by sending a status query to the robot via at least one communication link. The robot is further configured to emit an optical and/or acoustic signal for a specifiable period of time if the status query sent by the external device indicates a situation from which the robot cannot autonomously liberate itself.

Further described is a method for controlling an autonomous mobile robot that is configured to independently navigate in an area of robot deployment using sensors and an electronic map, wherein the robot regularly determines its position on the map and wherein the map may contain at least three differently classified regions. In accordance with one example the method comprises the robot determining its own position by means of the sensors and testing whether the robot finds itself in one of the at least three differently classified regions. When doing so the robot navigates autonomously and completes a task when it finds itself in a first region of the at least three differently classified areas. The robot navigates autonomously but stops carrying out the task if it finds itself in a second region of the at least three differently classified areas. A third region of the at least three differently classified regions is a virtual exclusion region that the robot is prohibited from entering autonomously.

Further described is a method for exchanging information between at least two autonomous mobile robots, wherein each of the at least two robots is configured to autonomously navigate in an area of robot deployment using sensors and an electronic map, as well as to compile and update the map autonomously. Each of the robots has a communication module with which they can send information to at least one other robot. In accordance with one embodiment the method comprises automatically determining a transformation operation for transforming coordinates of a first map of the first robot into coordinates of a second map of the second robot, sending position-related information from a first robot to a second robot and transforming the coordinates of the position-related information from coordinates of the first map into coordinates of the second map by applying the transformation operation. Further embodiments relate to robots that are configured to carry out the methods described here.

Further described is a method for entering a virtual exclusion region into an electronic map that represents an area of robot deployment of an autonomous mobile robot. In accordance with one embodiment the method comprises receiving a user input from the human-machine interface to define the virtual exclusion region, evaluating the user input, wherein it is tested whether the user input fulfills at least one previously specified criterion, and deciding—based on the evaluation of the user input—whether and if so in what geometric shape, the virtual exclusion region is to be stored in the map.

Further described is a method for controlling an autonomous mobile robots, wherein the robot is configured to autonomously navigate in an area of robot deployment using sensors and an electronic map, as well as to regularly determine its position on the map, wherein the map may contain at least one virtual exclusion region that the robot does not move into while navigating. In accordance with one embodiment, the method comprises recognizing, while navigating through the area of robot deployment, risk areas in which the functioning of the robot is endangered or restricted and automatically defining a exclusion region that includes the recognized risk area, as well as storing the exclusion region in the map. Further embodiments relate to robots that are configured to carry out the methods described here.

A further embodiment relates to a system that comprises an autonomous mobile and a projector. The robot is configured to autonomously navigate in an area of robot deployment using map data and the projector is configured to project information onto a floor surface or an object in the area of robot deployment. The system is configured to extract from the map information relating to a position, as well as the position itself and to project this information using the projector onto the floor surface at the corresponding position or onto an object that is located at this position.

Finally, an autonomous mobile robot is described. In accordance with one embodiment, the robot is configured to autonomously navigate in an area of robot deployment using map data, to receive position-based information from a user via a human-machine interface and, based on this information, to determine a path for the robot and to move along this path. While the robot is moving along the robot path, or afterwards, the position-based information is either rejected by the user or confirmed and permanently stored in the map data.

SHORT DESCRIPTION OF THE FIGURES

Various embodiments of the present application described in further detail using the examples illustrated in the figures. The illustrations are not necessarily true to scale and the embodiments are not limited to the aspects illustrated here. Instead importance is given to illustrating the underlying principles. The figures show:

Figure 2:
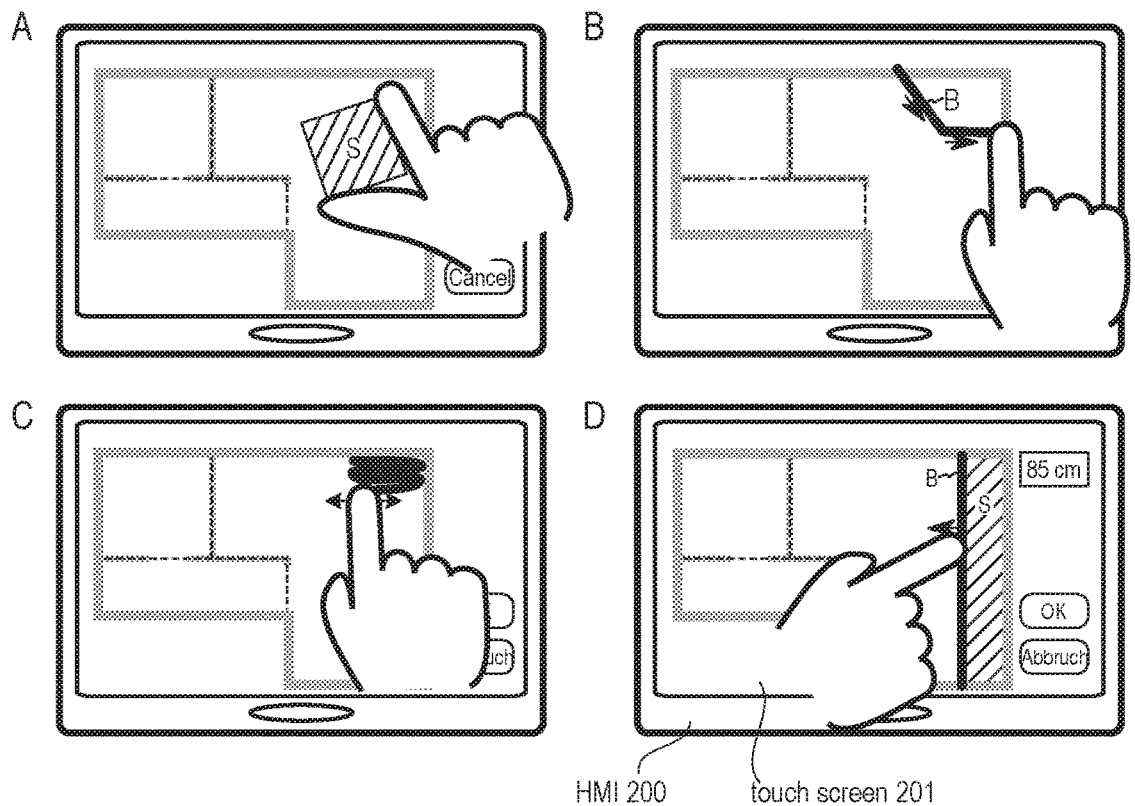

FIG. 2 schematically shows numerous possibilities for entering, by means of a map displayed on a human-machine interface, position-based information for defining virtual exclusion regions.

Figure 3:
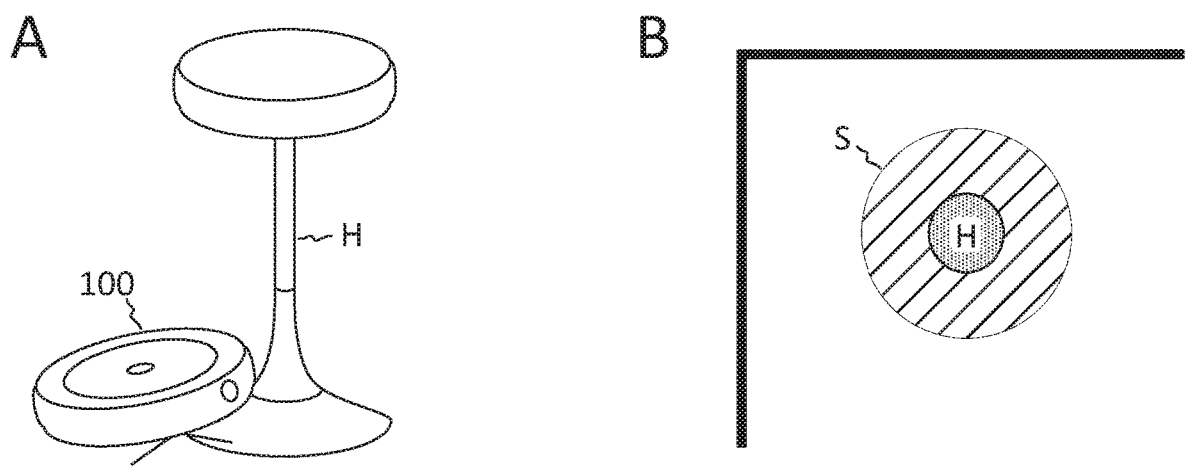

FIG. 3 shows a virtual exclusion region around an obstacle, the maximum dimensions of which are not easily detected by the robot.

Figure 4:
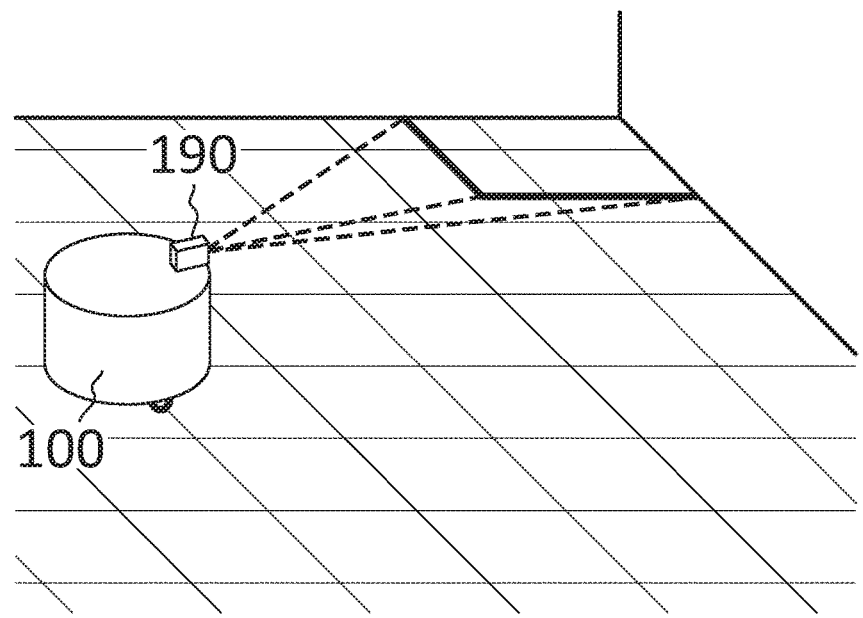

FIG. 4 illustrates an example of illustrating position-related information such as, e.g. a exclusion region, onto the floor surface by means of a projector.

Figure 5:
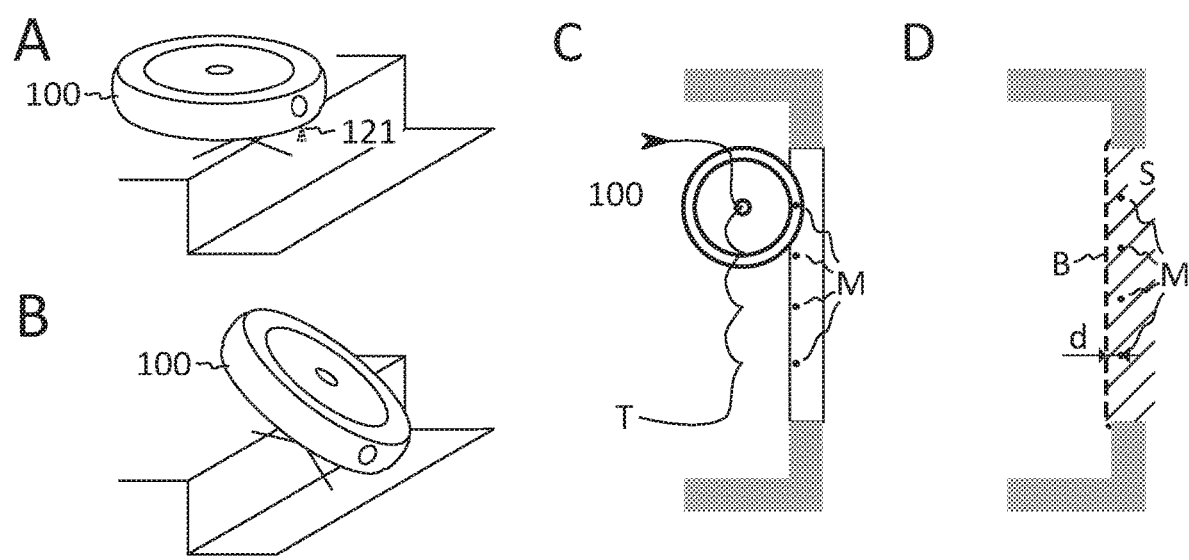

FIG. 5 illustrates an exemplary use of virtual boundary lines for securing points of danger such as, e.g. steps or obstacles.

Figure 6:
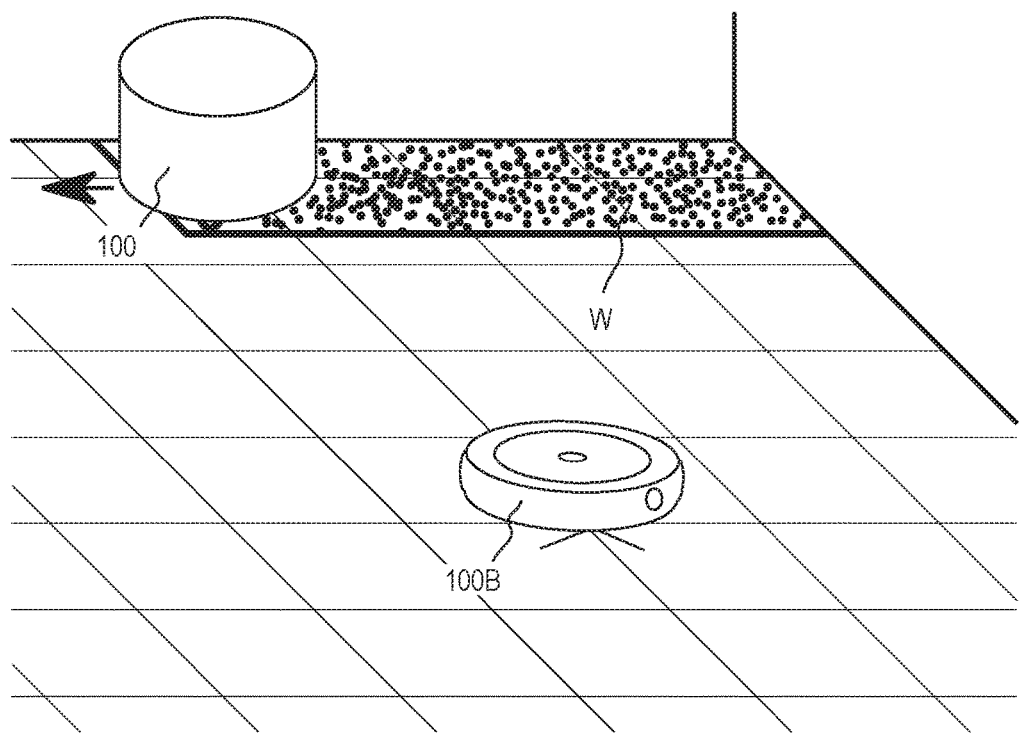

FIG. 6 illustrates an example of the interaction between two robots, in the course of which position-related information, for example, relating to virtual exclusion regions, is exchanged.

Figure 7:
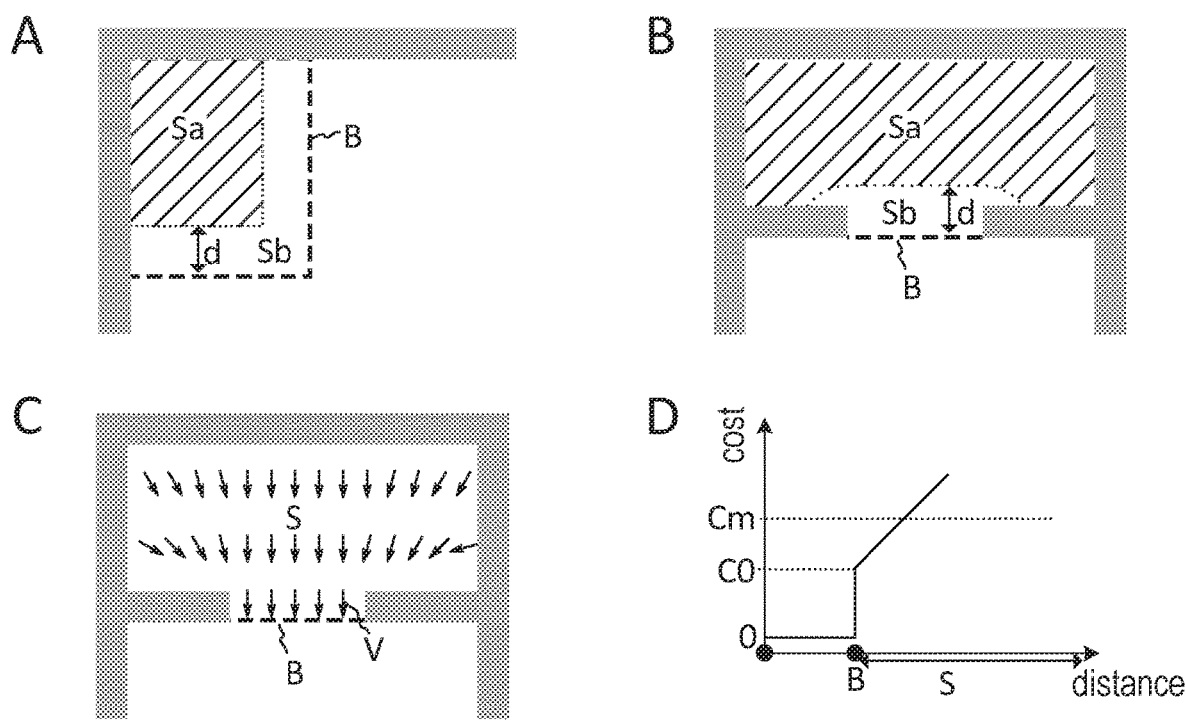

FIG. 7 serves to visualize various approaches to navigating out of virtual exclusion regions with an autonomous mobile robot.

DETAILED DESCRIPTION

As a service robot, an autonomous mobile robot autonomously carries out one or more tasks such as, for example, the cleaning or monitoring of the area of robot deployment or the transport of objects within the area of robot deployment (e.g. an apartment). The embodiments described here relate to a cleaning robot. However, they are not limited to cleaning robots, but may instead be applied to all applications in which an autonomous mobile robot is to carry out a task in a defined area of deployment in which it can autonomously move about (or navigate) with the assistance of a map.

Figure 1A:
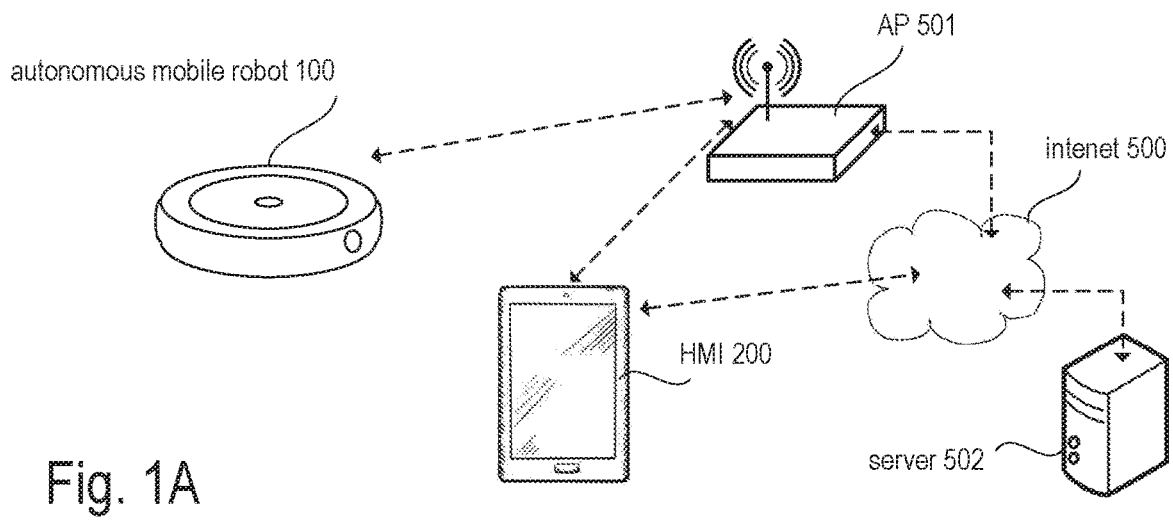
FIG. 1A shows a system with an autonomous mobile robot, a human-machine interface and a server that can communicate via a network connection.
Figure 1B:
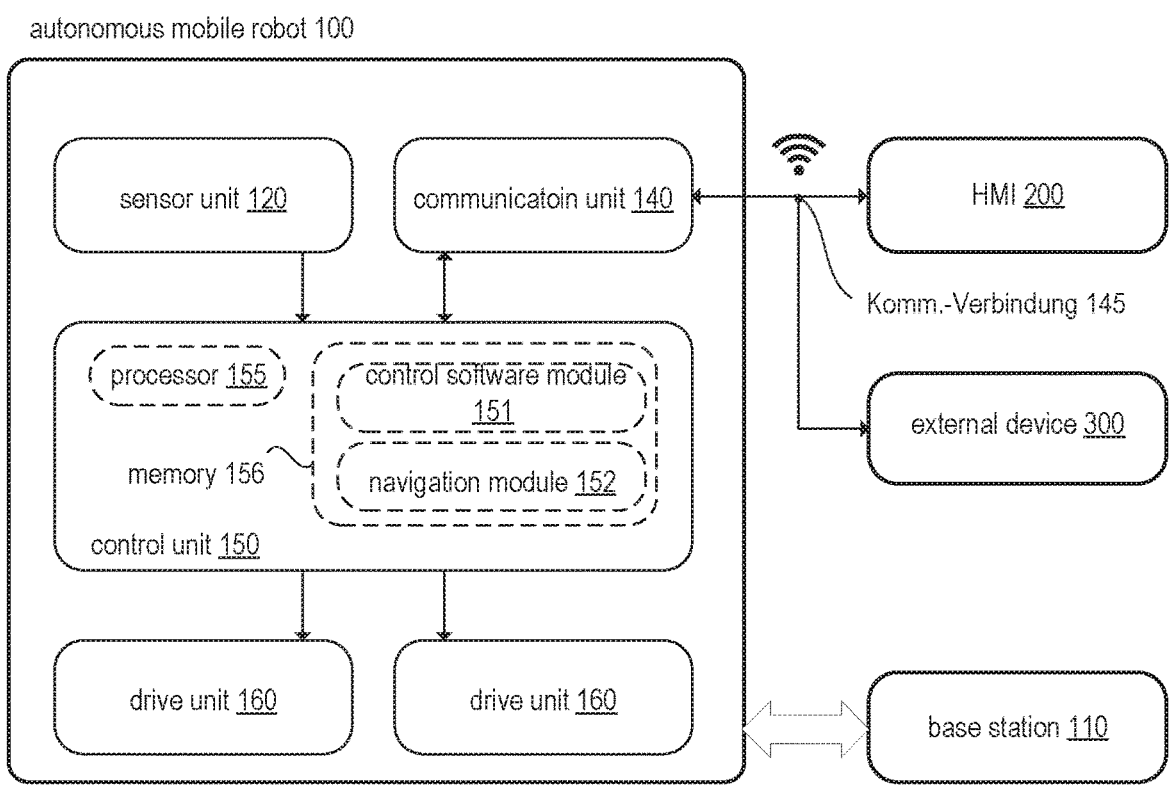
FIG. 1B shows, in a block diagram, the design of an autonomous mobile robot and its possibilities for communicating with other (external) devices.

FIG. 1A shows exemplarily the integration of an autonomous mobile robot 100 into a home network, which, for example, may by a wireless network (WLAN). In the present example, a WLAN access point 501 enables the robot 100 to communicate with a humane machine interface (HMI) 200, as well as with an external computer 502 (e.g. a cloud server) that can be accessed over Internet 500. FIG. 1B shows exemplarily in a block diagram the various units (modules) of the autonomous mobile robot 100 from FIG. 1A. Such a unit may comprise an independent component or it may be part of a software for controlling the robot. The software responsible for the behavior of the robot 100 (encompassing controlling soft ware 151 and navigation module 152, see FIG. 1B) can be executed in the control unit 150 of the robot 100 (by means of a corresponding processor 155 and memory 156). The control unit 150 can carry out some tasks at least partially with the aid of an external computer. This means that the computing operations needed by the control unit 150 may, at least partially, be outsourced to an external computer that can be accessed, for example, via a home network or over Internet (cloud).

The robot essentially operates autonomously. In order to be possible to operate without a great deal of interaction with the user, the robot possesses, for example, a base station 110 to which it automatically returns after completing a task. Here, for example, it can charge its batteries and/or (in the case of a cleaning robot) dispose of the dirt it has collected.

The autonomous mobile robot 100 includes a drive unit 170, which may comprise, for example, electromotors, transmissions and wheels, by means of which the robot 100 can—at least theoretically—access every point of its area of deployment. The drive unit 170 can be configured, e.g. to convert commands or signals received from the control unit into a movement of the robot 100.

The autonomous mobile robot 100 includes a communication unit 140 for establishing a communication connection 145 to the human-machine interface (HMI) 200 and/or to other external devices 300. The communication connection may be, for example, a wireless connection (e.g. Bluetooth), a local wireless network (e.g. WLAN or ZigBee) or an Internet connection (e.g. to a cloud service). The human-machine interface 200 can display for a user information regarding the autonomous mobile robot 100 (e.g. battery level, current work task, map data (i.e. information stored in a map, for example, a cleaning map—and which is thus position-related), and it can receive user commandos for the autonomous mobile robot 100 to carry out work tasks.

Examples of human-machine interfaces 200 include tablet PCs, smart phones, smart watches, computers or smart TVs. A human-machine interface 200 may also be directly integrated in the robot, allowing the robot to be operated, for example, by means of keys, gestures and/or voice input. Examples of external devices 300 include computers and servers onto which computations and/or data can be outsourced, external sensors that supply additional information or other household devices (e.g. other autonomous mobile robots 100B) with which the autonomous mobile robot 100 collaborates and/or exchanges information.

The autonomous mobile robot 100 may have a work unit 160 such as, for example, a cleaning unit for cleaning a floor surface (e.g. brushes, a vacuuming apparatus) or a gripping arm for gripping and transporting objects. In some cases such as, for example, in the case of a telepresence robot or a monitoring robot, a different component will be needed to carry out the intended tasks and no work unit 160 will be necessary. Hence, a telepresence robot possesses a communication unit 140 that is coupled to a human-machine interface 200 and which has a multimedia unit consisting, for example, of a microphone, camera and screen display to enable communication between persons who are separated from each other spatially by great distances. A monitoring robot detects unusual events (e.g. fire, light, unauthorized people, etc.) during inspection runs with the aid of its sensors and informs, for example, the user or a control center thereof.

The autonomous mobile robot 100 includes a sensor unit 120 that has various sensors, for example, one or more sensors for gathering information about the environment of the robot such as, e.g. the location of obstacles in the area of robot deployment or other navigation features (e.g. land marks). Sensors for gathering information about the environment are, for example, active sensors that measure the distance to objects (e.g. walls, obstacles, etc.) in the environment of the robot such as, for example, optical and/or acoustic sensors that can measure distances by means of triangulation or travel time measurements of an emitted signal (triangulation sensors, 3D cameras, laser scanners, ultrasonic sensors). Other typical examples of suitable sensors include passive sensors such as cameras, tactile or touch-sensitive sensors for detecting obstacles, floor clearance sensors (e.g. for detecting ledges, the steps of a staircase, etc.), sensors for determining the speed and/or the path travelled by the robot such as, e.g. odometers, inertia sensors (acceleration sensors, rotation rate sensors) for determining the position and changes in the movement of the robot or wheel contact switches that detect a contact between a wheel and the floor.

The aforementioned control unit 150 can be configured to provide all functionalities needed for the autonomous mobile robot 100 to be able to move autonomously through its area of deployment and carry out its tasks. For this purpose, for example, the control unit 150 includes, for example, a processor 155 and a memory 156 for executing a control soft ware (see FIG. 1B, control software module 151) of the robot 100. The control unit 150 generates, based on information provided by the sensor unit 120 and the communication unit 140, control commands or control signal for the work unit 160 and the drive unit 170. The drive units can convert these control signals or control commands into a movement of the robot. The control software module 151 can include software functionalities for recognizing objects and work planning. In order that the robot may be able to carry out a task autonomously, as a further software module a navigation module 152 is provided. The navigation module 152 may include software functionalities for navigation (e.g. map maintenance, map-based path planning, self-localization of the robot on the map, SLAM algorithms, etc.) of the robot. Naturally, the control software module 151 and the navigation module 152 can interact, exchange information and collaborate with each other. This allows the robot, for example, to orient itself in its environment with the aid of navigation features such as landmarks and to navigate. The navigation module 152 usually operates using an obstacle avoidance strategy (obstacle avoidance algorithm), a SLAM algorithm (Simultaneous Localization and Mapping) and/or one or more maps of the area of robot deployment. When doing so, in particular obstacles are detected with the aid of sensor measurements and their position is determined. The position of obstacles can be saved in the form of map data. These methods are generally known and will therefore not be discussed here in detail.

The maps of the area of robot deployment can be newly compiled during the deployment of the robot or a map that already exists when the deployment begins may be used. An existing map may have been compiled during a preceding deployment by the robot itself, for example, during an inspection run, or it may be provided by a different robot and/or a person and permanently stored, for example, in a non-volatile memory 156. As an alternative, the map of the area of robot deployment that is to be permanently stored may be saved outside of the robot, for example, on a computer in the household of the robot's user (e.g. a tablet PC, home server) or on a computer that can be accessed via the Internet (e.g. cloud server). In the example of FIG. 1 the map is contained in the navigation module 152. The map used by the robot is generally an electronic map which, as a rule, comprises a collection of map data that represent position-related information. A map therefore represents numerous data sets containing map data and this map data can contain any desired position-related information such as, for example, lines or other geometric objects (e.g. area elements). These lines may represent, for example, the contour of an obstacle (detected by the robot). However, not only geometric objects and their location in the area of robot deployment form part of the map data, but also information that relates to the significance and properties of the objects indicated on the map. For example, one or more attributes (properties) can be assigned to an object indicated on the map. Thus, certain (partial) regions of a map may be assigned an attribute such as "not cleaned" or "cleaned" and/or "carpet" or "wooden floor" and/or "blocked by an obstacle". Other attributes may, for example, classify a (partial) region as "kitchen" or may assign a time interval in the course of which the region in question is to be cleaned.

In general, the (electronic) map used by the robot 100 is a collection of map data for recording location dependent information regarding an area of the robot's deployment and the environment relevant to the robot in this area of deployment. One kind of location dependent information that can be stored in a map is information regarding the position of objects in the area of robot deployment. Such objects may be obstacles such as, e.g. walls, doors, pieces of furniture or other movable and non-movable objects into which the robot (at least theoretically) could collide. The robot's base station 110 may also be an object recorded on the map. The position of objects (obstacles) is usually defined using coordinates. A further kind of map data is location dependent information regarding the performance of a task by the robot 100 such as, for example, which surface areas have been processed, in particular cleaned, or which locations (in the area of robot deployment) the robot may be permitted to access while performing its tasks. A further kind of location dependent information is the partition of the area of robot deployment into numerous rooms and/or sub-regions. This partitioning can be carried out automatically by the robot 100 or with the assistance of the user. The user can carry out the partitioning manually or can manually revise a partitioning that was automatically carried out. The designation of the rooms (e.g. "room 1". "room 2", "corridor", "kitchen", "living room", "bedroom", etc.) may also form part of the map data. For various areas of robot deployment such as, for example, the different floors of a multistory building, different maps can be saved.

Further, the navigation module 152 is configured to allow virtual exclusion regions to be marked on the map which the robot may not access and/or travel over autonomously. This is carried out, for example, by the robot control 150 treating the area marked virtually as prohibited S as if the exclusion region S were an obstacle in the robot's 100 area of deployment. Thus, in order to prevent the robot 100 from entering the exclusion region S, the control unit 150 of the robot 100 can employ an obstacle avoidance strategy, also known as obstacle avoidance algorithm, which is configured to control the robot, based on the location of identified obstacles, to prevent the robot from colliding with these obstacles. The location of one or more exclusion regions can be determined based on the virtual exclusion region S stored in the map data. These locations can then be treated in the obstacle avoidance strategy in the same manner as a real obstacle at this location would be treated. Thus, in a simple and easy manner, the robot 100 is prevented from autonomously entering and/or travelling over a virtual exclusion region S. The following examples will illustrate this in greater detail:

Example 1

In one method for controlling an autonomous mobile robot the robot reacts directly to the measured distance to and/or relative position of an obstacle. For example, the robot continues to move forward until it is approximately 1 cm before the obstacle and then changes direction. In order to apply this method for controlling an autonomous mobile robot to virtual exclusion regions, the location of the robot on the map is determined and—based on the location of the exclusion region on the map—the distance and/or relative position (relative to the exclusion region) is determined. This is repeated in suitable time intervals.

Example 2

In a further method for controlling an autonomous mobile robot the robot determines the location of obstacles, for example, by means of distance measurements, and enters the location and, e.g. the contours of the obstacle into the map. Based on this map, the path a path for the robot is planned that leads around the obstacle and thus avoids a collision. In order to apply this method for controlling an autonomous mobile robot to virtual exclusion regions, at least during the planning of the path, the location of a exclusion region on the map is treated like the location of an obstacle.

Example 3

In a further method for controlling an autonomous mobile robot, the work is planned based on a map. For example, a surface to be processed in an area to be processed is determined for a floor processing robot (e.g. a cleaning robot for vacuuming, sweeping or mopping). This can be carried out before and/or during the processing. In addition, during the processing it can be determined which of the surfaces to be processed have actually been processed. When determining the surface to be processed it can be taken into consideration that surfaces on which an obstacle is located and surfaces that are inaccessible because of the presence of an obstacle need not (or cannot) be processed. In order to apply this method for controlling an autonomous mobile robot to virtual exclusion regions, at least while planning the work the location of an obstacle on the map is treated like the location of an obstacle. This means in particular that a surface occupied by a exclusion region, just like a surface occupied by an obstacle, will not be added to the surface to be processed.

Example 4

In some cases it may be of advantage to treat the exclusion regions like obstacles only for one part of the control method. Many commonly sold household robots have a round construction, allowing them to rotate at their point of location without running the risk of colliding with an obstacle. In the case of more complex geometric shapes, for example, those with one or more corners (in particular essentially rectangular forms), this is no longer ensured and, in order to control the robot without collision, for every rotation of the robot it must be verified that no collision will result during and after the rotation. In order to simplify the control of such a robot, it is suggested that the robot, when carrying out a translation movement, treat the virtual exclusion regions like obstacles and, when carrying out a rotation, that the exclusion region be ignored (as opposed to real obstacles).

In general, a virtual exclusion region S is a surface that the Robot should not move onto. It can be delineated by a virtual boundary B and real obstacles. In some cases the virtual boundary B can close the area of robot deployment, for example, in order to prevent the robot from entering an open (entrance) door. In both cases the virtual boundary B has the property that it divides the area accessible to the robot into an area that the robot may freely enter and into an area that the robot is prohibited from entering.

The virtual exclusion region S can be saved, for example, by saving the virtual boundary B or it can be saved in the map data as a surface. For example, the map data can be saved in the form of an occupancy grid map which represents the area of robot deployment in the form of a grid of cells and in which information is stored for every cell, i.e. whether a particular cell is occupied by an obstacle. In order to mark a exclusion region S on the map, the cells that belong to the exclusion region S can be marked as correspondingly occupied cells.

The virtual exclusion region S can be saved as a basic geometric figure such as a circle, square or rectangle, which has the advantage of reducing needed memory space. For example, in the case of a circle it is enough to save the position of its center point and the radius. In order to make more complex geometric shapes possible for the virtual exclusion region S, the virtual boundary B of the virtual exclusion region S can be saved, for example, in the form of a line chain (polygonal chain). Together with the virtual boundary B, the surface area that is to be closed off to the robot can also be saved. For this purpose the virtual boundary B can be saved with an orientation that makes it possible to distinguish what side of the virtual boundary B the robot is located on or should be located on (e.g. always to the right of the boundary B). In particular it may be determined whether the robot approaches the virtual boundary B from a first or from a second direction (e.g. from the left or the right), wherein the second direction is opposite the first direction. This is done, for example, by saving the line chain as vectored segments, i.e. as vectors with ending and starting points. In this manner the right side of the boundary B, for example, may be defined as accessible.

The virtual boundary B can be configured to allow it to be travelled over while moving from the prohibited surface onto the accessible surface, whereas movement in the opposite direction will be blocked. This means that the robot, when approaching the virtual boundary B from the first direction (e.g. from the right), will not be permitted to move onto and/or over the boundary autonomously. Thus the boundary will be treated, for example, like an obstacle (as described above). For this, while navigating, the robot uses an obstacle avoidance algorithm that takes into consideration the virtual boundary B in the same way as a real boundary of a real obstacle detected by the robot's sensors as long as the robot approaches the exclusion region defined by the boundary (i.e. coming from the right, for example). When, however, the robot approaches the virtual boundary B from the second, opposite direction (e.g. from the left), the boundary will have no effect and the robot will be able to travel over it.

Here it should be pointed out that such a virtual boundary B, in addition to being used to permanently delineate a virtual exclusion region, can also be used for temporary purposes. For example, it can be used to delineate a sub-region in which the robot is to carry out a specific task (e.g. cleaning). The virtual boundary B in this case will stay active until the robot has either completed or interrupted the task. This has the advantage of allowing the robot to enter the area to be processed. No additional control methods are needed in this case to keep the robot within the area to be processed (because, in this example, all of the area outside of the sub-region to be processed will be defined as virtual exclusion region). In the simplest case the robot control 150 only uses the obstacle avoidance strategy and a strategy for completing the task in a closed room.

Defining virtual exclusion regions—Adding virtual exclusion regions S to the map data can be carried out with a user input via the human-machine interface 200 (HMI). The information regarding the virtual exclusion region S entered by the user via the HMI 200 can be evaluated (analyzed) in accordance with specifiable criteria. As a result of this evaluation (analysis), it can be determined whether and, if so, in what form the exclusion region S is to be saved. This approach is described in detail in the following examples illustrated in FIG. 2.

FIG. 2 exemplarily illustrates how a virtual exclusion region S is entered vial the HIM 200 (e.g. a tablet PC). For this purpose, the HMI 200 is configured to display the map data as a map that can be readily understood by people. The user can enter the information regarding a newly defined exclusion region S into this map.

Diagram A of FIG. 2 shows the entering of a new exclusion region S by means of a (two-dimensional) geometric shape such as, for example, a square, rectangle, rhomboid, circle, etc. The size and orientation are determined, for example, by the position of the user's finger on a touch screen 201 of the HMI 200. The orientation of the basic figure can be determined by the user. As an alternative, the orientation can be at least partially determined based on the map data. For example, one side of the basic form (e.g. a square) can be aligned parallel to a close wall. The position and size of the exclusion region S can also be determined by the user or they can be determined based on the already existing map data. Thus, fore example, a virtual exclusion region designated in the corner of a room can be enlarged or moved until it boundaries on the walls. This is particularly useful in cases in which the area between the wall and the exclusion region S is narrower than the space needed by the robot to navigate.

Diagram B of FIG. 2 illustrates the delineation of a exclusion region by means of a virtual boundary B. In this manner the user can prohibit, for example, the robot from entering a corner of a room by determining a virtual boundary B in the form of a line or that of an (open or closed) polygonal chain. The thus determined exclusion region S is defined by the virtual boundary B and the walls. The user's input on the touch screen must be analyzed to determine whether a given surface should be closed off by a virtual boundary B and, if so, which surface. In this manner the HMI 200 can verify whether the virtual boundary B entered by the user divides the area of robot deployment into at least two connected sub-regions. This, for example, is the case when the virtual boundary B is represented by a closed polygonal chain or when the virtual boundary B connects two or more obstacles (e.g. two walls converging into the corner of a room). A sub-region of the area of robot deployment includes all of the possible positions that the robot can access from any other position within the sub-region without travelling over the virtual boundary B. This accessibility can be determined, for example, with the aid of path planning algorithms. In some cases, such as in that of a room with two doors, each of which is to be closed off to the robot 100 with a virtual boundary B, numerous lines (segments of a virtual boundary B) may be needed in order to divide the area of robot deployment into at least two sub-regions (the virtual exclusion region S and the remaining surface of the area of robot deployment.

Once the area of robot deployment has been divided into at least two connected components, which of the connected components is to be closed off can be automatically determined. Among the possible criteria for determining this could be that the largest connected component and/or the connected component in which the base station 110 and the robot 100 are located, are regarded as the area of deployment and, accordingly, all of the other connected components are saved as virtual exclusion region S.

If no conclusive determination of a new virtual exclusion region S can be made automatically (e.g. because the user's input was unclear, implausible or ambiguous), an query or a warning can be sent to the user. For example, the user may define an area in which the robot's base station 110 is located as exclusion region; in the example shown in Diagram B of FIG. 2, for example, the upper right corner of the room. An analysis of the user input reveals that there is one large and one very small sub-region (the corners of the room), and that the base station 110 of the robot 100 is located in the very small sub-region. This division may be regarded as implausible, hence it is not clear which area the user actually wants to close off. The user can be informed of this circumstance via the HMI 200 (e.g. by means of a message displayed on the touch screen), thus granting the user the opportunity to determine that the wrong corner of the room was erroneously closed off. Alternatively, the user can select one or more virtual exclusion regions S from the automatically determined sub-regions. When necessary, the user can then place the base station at a new position and inform the robot 100 thereof with corresponding user input.

Diagram C of FIG. 2 illustrates a further example of how the user can define a virtual exclusion region. Accordingly, the user can define the virtual exclusion region S with flat marking. This is done, for example, with a wiping movement of the finger. The user's input, in this case, is quite coarsely defined and it must be analyzed to determine where therein a suitable virtual boundary B of the virtual exclusion region lies. This is carried out, for example, by constructing the convex hull around the flat marking or by covering the flat marking with one or more rectangles (or a different geometric shape). This might be, for example, the smallest rectangular surface that encompasses the flat marking. In addition, the saved map data regarding obstacles can also be considered. Thus, for example, one side of the rectangle can be aligned parallel to a close obstacle (e.g. a wall).

Diagram D of FIG. 2 illustrates a further example of how the user can define a virtual exclusion region. Accordingly, the user can determine the exclusion surface starting, for example, from an obstacle (e.g. a wall) or other land mark. In this case, for example, the user touches the obstacle on the touch screen and pulls his/her finger away from the obstacle, thus expanding the virtual exclusion region S. Using this procedure makes it easy to define a virtual exclusion region S that ensures that the robot 100 will always keep a constant distance to the respective obstacle. Additionally or alternatively, the user can also directly adjust the distance (e.g. 85 cm) to the obstacle. The user's input must be analyzed to determine whether the virtual boundary B, and hence the virtual exclusion region S, can be precisely determined from the parameters (e.g. the distance to an obstacle) entered by the user, the designated obstacles and other possible neighboring obstacles.

The virtual exclusion region S that is defined by a constant distance to an obstacle (in particular to a wall) need not necessarily extend along the entire length of the obstacle. The user can further limit the exclusion region. This can be done, for example, with a linking operation. In order to close off, for example, the region in a corner of a room (having two walls), the user can define a first distance to the first wall and a second distance to the second wall. The link (intersection) of these so defined areas is the desired exclusion region S. This has the advantage of enabling the user to determine a virtual exclusion region very precisely.

The obstacle to which the robot 100 is to keep a distance defined by the user, must not necessarily be a wall. FIG. 3A show, for example, a bar stool H with a leg that is very difficult for an autonomous mobile robot 100 to navigate and that is also difficult to detect. It may be advantageous, as shown in FIG. 3B, to define a virtual exclusion region S starting from that part of the bar stool that was able to be detected as an obstacle H, so that, in future, the robot 100 automatically avoids the leg of the bar stool H. The exclusion surface is in this case a circle, for example, the center point and diameter of which is determined by the position and size of the bar stool leg. As the position of the bar stool is not permanent, a thus defined exclusion region S also has no permanent position. Instead, the position of the exclusion region S is determined anew based on sensor measurements of the robot 100 during every deployment of the robot. For example, using a camera and image recognition, the robot can recognize a bar stool as such. Alternatively, for example, it can be saved together with the map data that in a given sub-region (where the bar stools frequently stand) a virtual exclusion region S is to be maintained around obstacles of a specifiable size (corresponding to the detectable part H of the bar stool). Thus, the virtual exclusion region is not saved in the map in absolute coordinates, but relative to an obstacle. If the position of the obstacle changes the virtual exclusion region is accordingly shifted.

In the procedures described here, the position of the virtual exclusion region S is saved relative to a local obstacle or land mark and not in global coordinates of the global coordination system used for robot navigation. This allows for a more reliable consideration of the virtual exclusion region S and for precise movement along the virtual exclusion region S as, in this case, these are based on current sensor measurements. In this manner, for example, the user can close off a region of only a few centimeters (e.g. 5 cm) width parallel to any chosen wall. As in the example of the bar stool (cf. FIG. 3), virtual exclusion regions S can be defined to move along with an obstacle or land mark when any of these changes its position on the map. A change in this position may be brought about, for example, by a movement (e.g. due to shifting) of the obstacle in the environment or by correcting (e.g. measurement errors) of a position recorded in the map data.

Entering information regarding a virtual exclusion region S need not necessarily be carried out based on a map display. For example, the HMI 200 can be configured to recognize gestures of the user. For example, the user may define the contours of the virtual exclusion region S by pointing directly (at the exclusion region). A camera or a 3D camera that is integrated in the robot is then used to recognize the gestures. In this case the user's input must be analyzed to determine where, exactly, the user is standing and what positions the user is indicating with the corresponding gesture in order to determine the virtual boundary B and the virtual exclusion region S.

As a further option, information regarding a virtual exclusion region S can also be entered during a learning run of the robot 100, wherein the analysis of the entered information also takes into consideration the current position and orientation of the robot. Thus a user can make the robot 100 aware of regions to be avoided when the robot 100 explores its area of deployment for the first time. This is done, for example, in dependency on the position and orientation of the robot. Thus the user—for example, using a voice command "Stop, do not enter that corner!"—can point out to the robot that an area a room corner that it is approaching should be regarded as an exclusion region. In the same manner the user may instruct the robot to keep a certain distance, defined by the user, to the obstacle that it is examining. This input can be entered via the HMI 200 by means of previously defined commands (e.g. a remote control or a table PC). As mentioned above, the information can (alternatively or additionally) also be entered in the form of voice commands that are received and analyzed by an external microphone or by a microphone integrated in the robot 100 or the HMI 200. As an alternative or addition to this, other means of entering the information can also be used. Thus, for example, the user can employ a laser pointer that is configured to emit a line with which the user can project onto the floor surface. The position and course of this line can be detected by the robot using, for example, a camera and can be saved together with the compiled map data as a virtual boundary B of a virtual exclusion region S. Alternatively or additionally, commonly used marking means, such as magnet strips or infrared barriers can be employed to inform the robot of areas that are not to be entered. The course of these markings is examined by the robot using its sensors and a corresponding virtual exclusion region S is saved together with the compiled map data. This enables the marking to be removed after the learning run has been completed.

Verification of user defined exclusion regions—Virtual exclusion regions S that were created based on information received from a user may cause the robot to behave in an unexpected and undesired manner. For this reason, it is important to analyze the information entered by the user, not only to determine the virtual exclusion region S desired by the user, but also with a view as to how the exclusion region will affect the functioning of the robot. Numerous criteria, for example, can be considered for this purpose, the non-fulfillment (or breaching) of which will result in the virtual exclusion regions S being rejected and not saved unless an explicit command from the user to do so follows. Preceding this, a corresponding message can be sent to the user, informing him/her of why the virtual exclusion region S was not saved.

Thus it can be tested to determine whether the robot is partially and/or completely located within the virtual exclusion region S to be newly determined. If this is the case, the user can be made aware of it and can be asked how the robot 100 is to deal with this. This may be to refrain from saving the virtual exclusion region S. As an alternative, the user can save the virtual exclusion region and instruct the robot to exit the region. As a further alternative the user can instruct the robot 100 to remain motionless, and then retrieve it from the exclusion region some time later.

Tests can also determine whether the robot—with regard to the virtual exclusion region S—can effectively carry out a planned task and/or whether it can independently access places that are important for the functioning of the robot. This comprises, for example, the robot 100 being able to access the base station 110 from its current position and that the base station 110 is not located in an exclusion region. Tests can also determine, for example, whether the area of robot deployment that is not designated as an exclusion region can be freely accessed from the current position of the robot or the base station 110. This can prevent, for example, a virtual exclusion region S from being saved, if this exclusion region S renders another region in the area of robot deployment which is, for example, larger than a specifiable maximum size, inaccessible or only accessible over a long detour. In particular, the area of robot deployment can be divided up into numerous sub-regions that, for example, correspond to the rooms of an apartment or parts thereof. If one of these sub-regions becomes inaccessible due to (or blocked off by) a virtual exclusion region S, the user can be informed of this. The user then has the possibility to again confirm that the virtual exclusion region S is to be permanently saved, despite the significant restrictions it places on the area of robot deployment.

In order to determine whether a given area is accessible or blocked, known path planning algorithms can be used. In this manner it can be determined, for example, whether there is a path from the current position of the robot to the base station 110 given the consideration that the robot cannot be permitted to independently enter and/or travel over the virtual exclusion region to be newly created. In an analogous manner it can be determined whether there is a path leading from the base station to all regions of the area of robot deployment. A region on the map will, in particular, be regarded as inaccessible or blocked if a corridor leading to this region is narrower than a specifiable threshold. The threshold can correspond, for example, to the diameter of the robot plus a safety leeway that allows the robot to safely and reliably navigate through the corridor. The safety leeway can correspond to a maximum possible localization error of the navigation module 152 as determined, for example, while carrying out a SLAM procedure.

If it is determined that a given sub-region of the area of robot deployment will become inaccessible due to a virtual exclusion region S, testing can further be carried out to determine whether a minor alteration of the virtual exclusion region S would render the sub-region once again accessible. Entering information via a map, for example, is often imprecise and a slightly altered exclusion region will still satisfy the wishes and needs of the user. If, for example, a corridor restricted by an exclusion region S that leads to an area beyond the exclusion region is only as wide as the robot itself, then a small reduction of the exclusion region will be able to render the area beyond it accessible. Testing can determine, for example, whether a slight alteration of the virtual exclusion region S would fulfill the criteria or whether the virtual boundary B should be shifted or given a different form. If, for example, the virtual boundary is presented as an (open or closed) polygonal chain, then the corner points of the polygonal chain can be shifted.

Areas without a work task—It is not always possible to completely exclude the autonomous mobile robot 100 from entering an area in which it could potentially cause damage by designating it as a virtual exclusion region S. Such an area may be, for example, a corridor that connects all of the rooms that the robot 100 is to clean. The robot 100 must enter this corridor; otherwise it will not be able to carry out its task in the other rooms. Furthermore, shoes are often left lying about in a corridor and their laces might get tangled around actuators such as rotating brushes. This might, on the one hand, cause damage to the shoes and, on the other hand, hamper the robot 100 in carrying out its task. A further example might be a delicate carpet that the robot 100 should not treat using an actuator. e.g. a brush, but which lies in a central area that the robot 100 cannot travel around.

Taking into consideration the aforementioned problematic situations, it may make sense to exclude the corridor from being autonomously processed. For this reason the robot can be configured to distinguish at least three different categories of virtual regions. In a virtual region of the first category the robot can navigate autonomously and can carry out a defined task. In a virtual region of the second category the robot can navigate autonomously but refrains from carrying out a task autonomously. Regions of the third category are the exclusion regions described above. These are taken into consideration during the navigation of the robot 100 with the result that the robot 100 does not enter and/or travel over these regions autonomously.

The user defines these virtual regions, for example, in the manner described above with regard to the exclusion regions S. In particular (the robot or the HMI) can automatically advise the user to exclude a virtual exclusion region from processing if this would impair the functioning of the robot but to allow it to be entered. This means that the exclusion region becomes a region of the second category, which can be entered but in which no processing of the floor surface is carried out. Furthermore, it may be assumed that a region belongs to the first category (that is, with no restrictions placed on its accessibility or on the performance of a task) until the user provides an instruction message to the contrary.

Nevertheless, when carrying out its task, the robot will travel through the region excluded from processing (second category) as infrequently as possible and following the most direct route. Thus, the robot will only enter this region if this is needed to access the region of the area of robot deployment lying beyond it in order to carry out its task. Afterwards the robot will only enter this region again after, to the extent possible, completing its task. When travelling across this region care will be taken to choose the shortest and/or quickest route. Alternatively or additionally, a route may be determined that, to the extent possible, maintains a specifiable minimum distance to obstacles. If the minimum distance cannot be maintained because the robot must travel between two obstacles separated by a distance that is smaller than the twofold minimum distance, a path is selected that maintains a distance to the two obstacles that is as large as possible, hence and in particular, centered between them. Methods for obtaining such a path are known. For example, path planning can be carried out using a cost function, in which the cost can be determined based, among others, on the distance to obstacles and as a result the path incurring the least cost is used to control the robot. Alternatively or additionally, reactive control methods (e.g. virtual force field VFF) can be used which enable the robot to directly react to the distance to surrounding obstacles.

The latter can be achieved, for example, during the task planning, by means of a cost function. For this, the "cost", for example, of entering a region excluded from processing is set significantly higher than the cost for moving through the region to be processed. For example, a movement of 1 meter through a region excluded from processing may be given the same value as a movement of 10 meters through a region to be processed. Based on this the robot may even accept considerable detours in order to avoid the region excluded from processing. The concept of using a cost function in path planning is generally known.

Displaying the exclusion regions—One important aspect of a user-defined virtual exclusion region S is that the user should be able to quickly, easily and directly see the results of his/her adjustments. This purpose is achieved, among others, with a display on the human-machine interface, for example, in the form of a map. This map, being a simplified representation of the area of robot deployment, may be imprecise, and for this reason it may be advantageous to directly display back the virtual boundary B of the virtual exclusion region S. The approach described here can also be of an advantage in the case of other user input such as, for example, when entering a user-defined sub-region with a virtual boundary (e.g. in order to quickly select this sub-region for cleaning at a later point in time) or when directly entering the surfaces to be processed.

In accordance with one example, the robot 100 first receives location-based information, for example, regarding a virtual exclusion region, from a user by means of a human-machine interface 200. From this location-based information entered by the user, one or more lines (e.g. a rectangle, an open or closed polygonal chain) determined that represent, for example, the virtual boundary B of the exclusion region S (cf. FIG. 2). As mentioned above, the representation of the map of the robot deployment area is an inexact abstraction of the real environment. It is therefore desirable to give the user a realistic feedback (more realistic than the display of the map) concerning the effects of an exclusion region defined via the HMI 200. Taking into consideration the exclusion region S defined by the user, the robot can determine a path and follow it. The path can be travelled once, numerous times or until interrupted by the user. For example, the robot can move along the virtual boundary B of the exclusion region S so that it will not enter or pass through the exclusion region.

The type of visualization described is not only possible in the case of exclusion regions, but in that of any sub-region. When a new sub-region (e.g. a part of a room) of an area of robot deployment has been defined, the robot can move directly along the (virtual) boundary of the sub-region. When a user defines an area (within a room) that is to be cleaned, the robot, for example, can move along the virtual boundary on the inside of the surface to be processed in order to thus demonstrate to the user what area is to be processed. With this realistic demonstration, the user is given a direct impression of the results of his/her input. The user can then permanently save the information entered via the HMI 200, that is, the map data derived from this information (e.g. a polygonal chain), in order that they can be used in future to control the robot. Further, this grants the user the opportunity to recognize when the input does not result in the desired robot behavior and the input can be corrected and/or new location-based information can be entered. A correction in the user input can be directly converted into a correction of the robot path (to be once again demonstrated by the robot).

A further possibility for providing the user with a fast, simple and direct feedback on the input is to project the information directly onto the environment. For this purpose, a laser projector, for example, is used to directly project lines, forms, patterns or images onto the environment (e.g. onto the floor) with the aid of movable mirrors and one or more lasers to provide the light. The projector can be set up at a permanent location in the room or it can be mounted on the autonomous mobile robot 100 or on a further autonomous mobile robot 100B.

In the example illustrated in FIG. 4, a projector 190 is arranged on or integrated in the autonomous mobile robot 100. The arrangement shown here has the advantage that the projector 190 can be transported to (almost) any given location in the robot deployment area. In particular, the robot 100 can move to a suitable location for carrying out the projection. Thus, using the map data and the sensor data, a position can be determined from which the needed information can be projected onto the desired location (in particular the floor surface) of the robot deployment area without being disturbed by obstacles. If, while at this position, it is determined that an undisturbed projection on the desired location has become impossible due to a new obstacle or due to a user standing in the way, the robot 100 can search for an alternative suitable position using the map data and the sensor data.

The special aspect of this approach is that it enables the location-based information (e.g. boundary lines or basic geometric shapes that represent an exclusion region, etc.) to be projected directly onto the site in question and, in this manner, to be visualized for the user. When computing the projection the position and orientation of the robot 100 in the area of robot deployment is used. The position and orientation are known to a high degree of precision thanks to the functionality of the autonomous mobile robot. In addition to this, the position and orientation of the projector 100 in or on the robot 100 is used which, due to the construction of the robot, are already known. Based on this information it can be determined how to project the light beams in the environment (or how to control the mirrors and the laser(s)) so that they fall on the points in the environment of the robot (in particular on the floor surface) that are determined using the map data. Thus, it is possible to extract location-based information from the map data and, using the projector, to display this information onto the real site in the area of robot deployment to which it corresponds.

In the manner described above the virtual boundary B (see, e.g. FIG. 2B), for example, can be made visible to the user by directly projecting it onto the floor. Additionally or alternatively, the virtual exclusion region S can be made visible to the user by directly projecting it onto the floor. In the same manner, other map data such as, e.g. the surface to be cleaned or a user-defined sub-region, can be displayed. In particular map data compiled by the robot 100 can be additionally projected directly onto the area of robot deployment by the projector 190. This may represent, for example, the area just cleaned by the robot 100 or the area that is to be cleaned next. In this way the user can be warned of the risk of slipping on a recently mopped surface.

In accordance with one embodiment, the information displayed by the projector 190 can be derived directly from the current position of the robot 100 and (optionally) from its speed and/or the task it is currently carrying out. Thus, for example, the immediate planned robot path can be projected onto the floor surface. By doing so, the robot behavior will be able to avoid disturbances to the work process that were unanticipated and are undesired by the user.

Automatic generation of exclusion regions—A virtual exclusion region S need not necessarily be defined by the user by means of information entered via an HMI 200. The autonomous mobile robot 100 can also be configured, for example, to recognize a risk area on its own and, based on this, to independently define an exclusion region S in order that the recognized risk area be avoided in future. Risk areas are primarily those areas in which the functioning of the robot could be impaired or which might otherwise be dangerous for the robot. The robot is only capable of recognizing such areas in that it, for example, moves over them with the aid of sensors or analyzes the navigation capabilities. This will be explained in greater detail in the following examples of FIG. 5.

FIG. 5A shows a ledge (e.g. a step of a stairway) as an illustrative example of a risk area that the robot is only capable of recognizing when it moves over it. Robots typically have floor sensors 121 on their underside for detecting just such a ledge. These are arranged on the robot 100 such that it can stop in time before falling over the ledge. Nevertheless, a malfunction (e.g. due to dirtied sensors) can always arise that could result in the robot 100 not recognizing the ledge and moving onward to fall over it (see FIG. 5B).

In order to avoid accidents like the one illustrated in FIG. 5B, the robot 100 can be configured, for example, to detect and avoid the ledge using known means (e.g. by means of sensors 121) during a deployment (e.g. a learning run or the first performance of a task, e.g. cleaning) in order to avoid an accident. An exemplary trajectory of the robot is illustrated, e.g. in FIG. 5C. Accordingly, the robot 100 moves partially over the ledge until the floor sensors 121 detect this, wherein the positions of these measurement points M are determined and saved. Afterwards, based on these measurement points M and, optionally, on other local and map data such as, for example, the travelled trajectory T, a virtual boundary B and/or a virtual exclusion region S is (are) determined that, when the exclusion region is observed by the robot, ensure(s) that it will maintain a minimum distance d (e.g. 1 cm) to the position of the ledge (in particular to the measurement points. Cf. FIG. 5D). This enables the robot to clean along the ledge, navigating so that it does not fall over the ledge. In particular, it navigates, making allowance for the virtual exclusion region S so as to eliminate the need of the floor clearance sensors 121 being triggered, which significantly reduces the risk of a fall due to a malfunction.

When the virtual boundary B is determined it is taken into consideration such that the positions of the measurement points M of a well examined ledge are a maximum distance to each other that is smaller than the diameter of the robot (otherwise the robot could travel between the two measurement points and recognize an accessible area or again detect the ledge). A (non-accessible) area may be completely encompassed by a ledge, or by a ledge and additional obstacles (walls, cf. 5C). The positions of the measurement points M in this case can be connected, piece by piece. As the case may be, the thus produced line can be extended to an adjacent obstacle (e.g. towards a wall). The resulting line delineates the surface travelled over by the robot from an inaccessible area. A shift of the line in the direction of the surface already travelled produces the results described above. i.e. a virtual boundary B. It should be noted that this is only one of many possible ways of constructing a virtual boundary B for the purpose of securing a ledge. A further possibility would be for every measurement point M to define a circle with a radius that corresponds to the radius of the robot plus a safety clearance d. Overlapping circles are combined into an exclusion region. The corresponding virtual boundary B is produced by smoothing the outer contour (e.g. (in pairs) convex hull). In this case the middle point (of the approximately circular contour of the robot) can be used for navigation.

A further example of a situation in which the robot can independently define exclusion regions has to do with obstacles that the robot cannot recognize or can only recognize with difficulty. In one example, to recognize obstacles and compile a map, the robot makes use of an active sensor that emits an (e.g. optical) signal and receives back its reflection off of an obstacle. Transparent obstacles such as a glass door, for example, mirrors or other mirroring obstacles and obstacles located outside of the range of the emitted signal (e.g. low obstacles) cannot be detected using such means or can only be detected with great difficulty. These obstacles are detected by the robot by means of touch, for example, using a tactile sensor (a sensor that detects the physical contact to the obstacle). However, users do not want the robot to collide with obstacles all too frequently or repeatedly. For this reason the robot can be configured to determine, during a robot deployment (a learning run or while carrying out a task), the position of obstacles that can only be detected tactilely (by means of touch) and not contactless (e.g. by means of optical sensors). At these positions (analogously to the previously described example with the ledge) a virtual exclusion region S and/or a virtual boundary B is created such that, when the virtual exclusion region is considered, the robot maintains a specified distance d (e.g. 1 cm) to the obstacle and no longer touches it. This procedure enables the robot to contactlessly clean around obstacles that it can actually only detect through contact. This minimizes the risk that either the robot or the obstacle is damaged in a collision.

A third example of a situation in which the robot can independently define exclusion regions has to do with regions in which the robot can only navigate with difficulty. Such a region may be, for example, a deep pile carpet on which numerous small obstacles such as, e.g. table and chair legs, are located. As movement is greatly impaired by the carpet and the table and chair legs essentially form a labyrinth for the robot through which it must navigate with particular precision, this situation is difficult for the robot to deal with. It may therefore happen that the robot is unable to liberate itself out of this situation or only after a longer period of time. The robot can recognize such a problematic area, e.g. from the spin of the wheels and/or from being occupied longer than usual in the area and with a great deal of maneuvering. In order to raise efficiency, this area can therefore be made into an exclusion region, thus avoiding the risk of the robot becoming stuck at this location and/or consuming a great deal of time and energy in following deployments. This area would then only be cleaned, for example, after receiving the explicit command of a user to do so.

Before an automatically compiled virtual exclusion region S is permanently saved with the map data, it can be shown to the user. The user can then decide whether the virtual exclusion region S should be saved, as proposed, or whether the robot should enter this area (despite the warning) in following deployments.

The position of the automatically generated virtual exclusion region can be coupled to land marks that the robot can easily detect. In this manner, for example, the virtual boundary B of FIG. 5D can be saved as a connecting line between the bordering walls. In this case the edges serve as easily recognizable land marks, in reference to which the virtual exclusion region S is saved. This means that the position of the exclusion region S or of the boundary B is saved in the map relative to the position of a detectable land mark (e.g. a wall). As a result of this direct link to easily detected land marks, the position of the virtual exclusion region S can be significantly more accurately and more reliably taken into consideration during navigation than when the position is only known as coordinates of the global map used by the robot to navigate.

Exclusion regions defined by other devices—When a first autonomous mobile robot 100 compiles a virtual exclusion region S it may be expedient to send it further to one or more other robots. Analogously, the robot 100 can receive virtual exclusion regions S from an external device 300, in particular from a second autonomous mobile robot 100B. This situation is exemplarily illustrated in FIG. 6. In this case it is possible for the first robot 100 to compile a virtual exclusion region S which (exclusively) is taken into consideration by one or more other robots (e.g. the second 100B), but not from the first robot 100 that compiled the virtual exclusion region S. To exchange the information regarding a virtual exclusion regions S, the involved devices (first and second robots 100 and 100B) make use of a communication link that can be established via the communication unit 140 (see FIG. 1B).

The second robot 100B may also have map data at its disposal that represent the area of robot deployment. This can be the same data as that used by the first robot 100, or it can be data that the second robot 100B has received, updated and/or interpreted. If the robots 100, 100B use different data sources, the coordinates for defining the position in relation to the map data of the first robot 100 can be transformed into coordinates for defining the position in relation to the map data of the second robot 100B (and vice versa). This transformation can be carried out automatically in one of the robots 100, 100B or in an external computer such as a PC or cloud server. The parameters for the (coordinate) transformation can be determined, for example, by means of the least squares fit method and based on existing navigation features such as the position of walls. In the simplest case, the (coordinate) transformation for a two-dimensional map consists of three parameters that describe a shift (two parameters) and a rotation (one parameter). More complex transformations are imaginable, for example, for the correction of (systematic) measurement errors of the sensors or to include three-dimensional maps. For example, a sensor for measuring distance of the first robot may systematically measure distances as shorter than a distance sensor of the second robot. This can be compensated with an additional scaling parameter. In another example, the pose (position including orientation) of a base station (or of a different navigation feature) is used to calculate the coordinate transformation. Assuming the pose saved in the map of the first robot diverges (even slightly) from the pose saved in the map of the second robot—since the same real base station (the same real navigation feature) is concerned in both maps, a transformation operation (e.g. a shift plus a rotation) can be derived from the two poses.

In one exemplary method in which information is exchanged between at least two autonomous mobile robots, 100 and 100B, both robots 100 and 100B are configured to autonomously navigate in an area of robot deployment using sensors and an electronic map, to autonomously compile the map and to update it. Both robots 100 and 100B have a navigation module (see FIG. 1B, communication unit 140) by means of which they can send, directly or indirectly via an external device (e.g. a server), information to the respective other robot. In accordance with the present example, a transformation of the coordinates of a first map of the first robot 100 into a second map of the second robot 100B is automatically determined. This can take place in one of the two robots or in an external device (e.g. the server). Position-based information (map data) is sent from one of the robots (e.g. robot 100) to the respective other robot (e.g. robot 100B). The coordinates of the position-based information are transformed from coordinates of the first map into coordinates of the second map by applying the transformation operation, before sending the information (in the robot 100), after sending the information (in robot 100B) or while sending the information (in the external device by means of which the information transfer is carried out).

Besides the previously described virtual exclusion regions S defined by a user and the virtual exclusion regions S that are automatically generated based on a malfunction and/or on a risk area (identified by the first robot 100), virtual exclusion regions S that are based on a deployment of the robot (a robot deployment for carrying out a task) can also be used for the robot interaction.

For example, the user may have spilt a liquid, such as, for example, milk, and gives the mopping robot the task of removing the puddle. In the example illustrated in FIG. 6 the robot 100 is configured as a mopping robot whose work module is configured to damp mop the floor. While the first robot is busy mopping, no other robot (such as, e.g. robot 100B) should travel through the puddle and spread the liquid. Furthermore, no other robot should travel through the freshly mopped (and hence still wet) area. The first robot can determine the area to be cleaned based on the user's input and, if needed, additional sensor measurements. It can inform other robots in the household that this area to be cleaned should be (e.g. temporarily) treated as a virtual exclusion region S.

After the mopping robot 100 has completed its task, a message can be sent to the other robots 100B to reopen the virtual exclusion region S. Alternatively or additionally the virtual exclusion region S can have an automatic expiration time. Thus the mopping robot 100, for example, can define a freshly mopped and, consequently, still wet area W as an exclusion region for a specified period of time, closing the area off to other robots (see FIG. 6). After this time has expired, the other robots 100B can automatically delete the virtual exclusion region S.

Activation/deactivation of exclusion regions—It may be that the user does not want the robot 100 to observe a virtual exclusion region S at all times. At the same time it may be that the user would prefer not to constantly delete and generate anew the exclusion region. For this reason is can be useful to specify criteria that can be used to decide whether or not the autonomous mobile robot 100 is to observe a virtual exclusion region S during navigation. This means that the robot can decide, based on certain criteria, whether or not to autonomously enter and/or travel over the virtual exclusion region S.

For example, a virtual exclusion region S may be always observed by the robot 100 unless the user (e.g. by means of the HMI 200) explicitly deactivates the exclusion region S for a task to be carried out or for a specifiable period of time. The virtual exclusion region S, for example, may be a corner of the apartment used as a play area in which small objects in the form of toys are often left lying about that could impair the functioning of the robot 100 while autonomously travelling over the region or while carrying out there an autonomous task, such as cleaning the floor. The user may occasionally tidy up this area and then want it to be immediately cleaned during the next deployment of the robot. Thus the user can instruct the robot 100 via the HMI 200 that the virtual exclusion region S is to be immediately entered and cleaned. The virtual boundary B can be used in this case as the boundary of the area to be cleaned. The exclusion region S will be once again observed in subsequent deployments.

Alternatively or additionally the user can inform the robot that, for the duration of the following deployment (in particular while the apartment is being cleaned), the virtual exclusion regions S will be inactive. The robot can then navigate as if the virtual exclusion region S was not saved and can automatically clean it. As an alternative, the Robot can interpret the virtual exclusion region in accordance with the virtual boundary B as a distinct sub-region to be cleaned and can process the area separately. For this purpose, for example, the virtual exclusion region can be entered with higher priority. As a further alternative, the virtual exclusion region can be entered as the last sub-region during the deployment of the robot as it should be assumed that unexpected problems could arise in this area that may result in an interruption of the robot's task.

Alternatively or additionally the user can inform the robot that the virtual exclusion region S will be inactive for a specifiable period of time. Situations arise, for example, in which children that play in the play area of a child's room are present for hours or even days. During these periods the robot can take the play area marked as a virtual exclusion region S into consideration when autonomously planning its work task. After the time period specified by the user ends, the virtual exclusion region S can automatically once again become active and will thus be observed by the robot.

In a further example, the activation/deactivation of a virtual exclusion region S is automatically controlled using a calendar function. For example, a user may not want the robot to navigate through the bedroom at night, but the robot should clean the bedroom, for example, during the day. In such a case, for example, the times at which the virtual exclusion region S is active are marked in a calendar and will be accordingly observed by the autonomous mobile robot 100 so that it will not autonomously enter and/or travel over it. For example, the bedroom can be closed off to the robot in the night from 9 pm to 9 am.

A calendar function, while offering the user a certain degree of convenience from the automation, is nevertheless inflexible. The purpose of closing off the bedroom in the preceding example is to prevent the sleeping user from being disturbed. It may therefore make sense to couple the activation of the exclusion region to the activity of the user. In particular with regard to the example of the sleeping user, however, the robot should avoid, if possible, entering the room to check whether the user is (still) sleeping. For this reason, other devices 300, such as articles of daily use, sensors and/or other robots can be used to determine whether a virtual exclusion region S is to be observed (is activated) or not (e.g. the robot may enter the bedroom). Thus, with the aid of sleep trackers, bed sensors or the sleep modus of an activity tracker, fitness tracker, smart watch or other wearable devices it can be determined whether the user is asleep. Alternatively the use of an electric toothbrush can be used. Thus the virtual exclusion region can be activated in the evening when it is detected that the electric toothbrush is being used and the virtual exclusion region can be deactivated in the morning when the electric toothbrush is used again. Many other scenarios are imaginable in which the activation of a virtual exclusion region S is based on a condition and/or information regarding an external device 300.

Further, the activation/deactivation of a virtual exclusion region S can be made to depend on the state and/or activity of the robot. For example, the robot may be equipped with various cleaning modules intended for various kinds of dry and/or damp cleaning operations. In this case the activation of an exclusion region can depend on the cleaning module used. For example, a carpet or other water sensitive floor surface can be treated as a virtual exclusion region S when a damp cleaning module is active. Another example of how the activation/deactivation of a virtual exclusion region S can be made to depend on the state and/or activity of the robot concerns a transport robot that assists in the household. Such a robot, for example, may transport drinks in open glasses. In this case the robot should avoid uneven floor surfaces such as, e.g. the edge of a carpet. In order to achieve this, the carpet can be defined as a virtual exclusion region for the time during which the robot is transporting the drinks.

While the autonomous mobile robot is carrying out a task, in particular in a virtual exclusion region S, the basis for deciding whether the virtual exclusion region S should be observed during navigation of the autonomous mobile robot 100 may change. Therefore, testing whether a virtual exclusion region should be observed or not can be carried out constantly, or at least in regular intervals, during the deployment or while planning the work task. If, as a result of such testing, the robot determines that a virtual exclusion region that should be observed has been added, it may happen that the current position of the robot 100 is within the virtual exclusion region S. In this case the robot, for example, can stand still and await instructions from the user. Alternatively, the robot can completely or at least partially finish the current task before the virtual exclusion region is activated. For this purpose, for example, the time needed to complete the task can be calculated. If this time is less than a specifiable maximum value, the task will be completed and the activation of the virtual exclusion region will be delayed by this amount of time.

Robot in exclusion region—Generally a (virtual) exclusion region S will be reliably avoided by the robot in that, for example, it treats this region like a real obstacle during navigation. This procedure will work as long as the autonomous mobile robot 100 knows its position on the map with sufficient precision. However, a robot may end up in a virtual exclusion region S if, for example, the user defines a sub-region and designates is as a virtual exclusion region while the robot is still in the sub-region. Another problem can arise if the robot 100 does not know its own position with sufficient precision. Thus it may happen that the robot (without "knowing" it) moves unnoticed over a virtual boundary. In such a case the robot may enter an exclusion region and cause damage. Here it should be noted that the robot, even when attempting to navigate collision-free, may still collide with obstacles. If such a collision takes place, however, the robot can take note of this and correspondingly adapt its navigation strategy. In the case of a virtual exclusion region, this immediate feedback (in the form of a collision) is missing. Therefore, additional means are needed to render the robot's behavior robust against such errors that may occur when dealing with a virtual exclusion region. These means are described in detail in the following.

One possibility for making the way in which the robot deals with virtual exclusion regions S more robust is to only prohibit the virtual boundary B from being travelled over in one direction (as described above). The result of this is that the robot 100 can always exit a virtual exclusion region but will be prevented from entering the exclusion region. In other words, virtual boundaries B that are marked on the robot's map only function in one direction; a virtual boundary can be travelled over in one direction, but not in the other.

Alternatively or additionally it can be tested whether the robot is located entirely or only partially within a virtual exclusion region S. Depending on the results of this test a decision can be made as to whether the robot should exit the exclusion region S or stand still. For example, the exclusion region can be divided into a border area and a core area. If the robot is at least partially located in the core area it will be stopped. If, however, the robot is only in the border area of the exclusion region S then the robot will attempt to navigate out of the exclusion region S. This feature of the exclusion region S (that divides the region into a border area and a core area) is—metaphorically—also called a "soft wall". This means that, during the navigation of the robot, the exclusion region does not have the effect of a "hard" wall, but that there is instead a "soft" transition area that the robot can enter, although it will then attempt to exit the boundary area, if possible. A message, for example, can be sent to the human-machine interface 200 informing the user of the problem and requesting the user's instructions.

The testing can be carried out continuously during the navigation, e.g. whenever the robot position is determined anew. The testing can also be carried out, for example, when a new virtual exclusion region S is defined and/or activated by the user or by another device. If the robot finds itself in a newly generate virtual exclusion region S, saving the virtual exclusion region S can be delayed until the user has confirmed it, for example. Additionally or alternatively the robot can be automatically directed out of the exclusion region S. Additionally or alternatively, the device (or user) that generates the exclusion region S can be informed that the robot is located in the newly generated exclusion region S. In addition to this, an query can be sent to the device (e.g. HMI 200) or user that generates the exclusion regions S as to how the robot can exit the newly generated exclusion region S. For example, the user can indicate to the robot a preferred direction in which the robot should exit the exclusion region. Alternatively, the user can stop the robot and carry it out of the exclusion region manually.

In the case of an already existing but inactive exclusion region S, operational information can be coupled to the exclusion region S and saved. In this manner, for example, a bedroom can be defined as an exclusion region S that becomes active when the user goes to bed. In this case the robot can autonomously exit the exclusion region S when it is activated. In other cases it may be preferable for the robot to stand still until the exclusion region is once again deactivated or until a user intervenes.

One deployment scenario of an autonomous mobile robot 100 can include it being manually moved, which normally results in the robot losing the information about its own position on the electronic map. After being moved, the robot can once again determine its position by means of global self-localization. To do so the robot 100 moves about the surrounding area to collect information about it with the aid of its sensors and then compares the data with the existing map data. Since the robot, while conducting the self-localization, only possesses a little information about its actual position in regard to the map data, or possesses no information at all, it may happen that it unintentionally enters an exclusion region S. For this reason it is important for the robot to test, after completing the global self-localization, whether it is located in a virtual exclusion region S according to the saved map data.

During the self-localization the robot can test, based on localization hypotheses (that is, on hypotheses based on the sensor and map data regarding the possible position of the robot, for example, a probability model) whether it is in or near a virtual exclusion region S. Based on this information, the robot can adapt its exploratory run for the global self-localization in order to reduce the risk (i.e. the probability) of unintentionally entering a virtual exclusion region. Localization hypotheses for (global) self-localization that are based on probability are known and will therefore not be discussed here in detail. Relevant to this example is the fact that, if the robot does not know its exact position during an exploratory run for self-localization, it can only determine probabilities for specific map positions. When doing so the robot can also test to determine with what probability it is located in an exclusion region. The robot can then adapt its current path in dependency on this probability. If, for example, the probability of the robot finding itself in an exclusion region S increases while it moves along a given path it can change its direction of movement until the probability once again decreases.

In addition to testing whether the robot 100 is located in an exclusion region S, the path travelled by the robot 100 during the global self-localization can also be recorded. This recorded path can be used to exit the exclusion region. In this case, for example, the robot can follow back along the recorded path until it has left the exclusion area or at least until it is able to safely exit it.

A user may accidentally place the robot in a virtual exclusion region S when moving it, or intentionally, for example, if the user wants this region to be cleaned (as an exception). Starting from the position at which the user puts down the robot, the robot begins (as described above) a global self-localization. Based on the travelled path recorded while carrying out the global self-localization, the starting position of the robot can be determined and it can thus be established whether the user had started the robot 100 in a virtual exclusion region S. Afterwards, the robot can carry out a task in the virtual exclusion region S as specified by the user. In addition to this, the robot can send a corresponding message (e.g. warning) to the user via the HMI 200.

There are various ways of deciding whether, and if so how, the robot is to navigate out of the exclusion region that may be employed individually or in combination. In FIGS. 7A and B, the virtual exclusion region S is divided into a first sub-region Sa and a second sub-region Sb. If the robot finds itself in the first sub-region Sa, it stays standing (emergency stop). If the robot finds itself in the second sub-region Sb, it exit the exclusion region by travelling over the virtual boundary B. The virtual exclusion region S is divided up such that, for example, starting at the virtual boundary B, everything at a distance d (e.g. the width of the robot) belongs to the second sub-region Sb. In other words, the robot carries out an emergency stop if it finds itself further away from the boundary B than a specifiable distance and it exit the exclusion region S autonomously if it is closer than that to the boundary B. This division of the virtual exclusion region S can be carried out, for example, based on user input. The user input can indicate how important it is for the exclusion region to be observed. If it is very important that the exclusion region be observed, the width d of the second sub-region Sb can be made to be very narrow (e.g. 1 cm) or the sub-region can be done away with altogether.

A further way for the robot to navigate out of an exclusion region is based on a virtual force field (VFF) analysis. The force field analysis is a (generally known) method for controlling the robot reactively without planning effort (i.e. without an advanced planning of a robot path). For this purpose, based on the sensor measurements and on the destination of the robot, a virtual force field is determined (calculated) that "impacts" the robot. The terms "force" and "force field" are to be understood in this context metaphorically. No real physical forces impact the robot, but only virtual ones. The control unit (see FIG. 1B) of the robot is configured, however, to calculate these virtual forces and the robot can then react to the forces (e.g. by retreating in the direction of the virtual force impacting the robot). As in the case of physical force fields, the virtual force fields from various sources (obstacles, destination of the robot) can be added up. Based on the direction and magnitude of the resulting virtual force on the current position and orientation of the robot, control commands for the drive unit are generated. Thus, the robot control reacts directly to the sensor measurements and no added planning effort is needed. This force field analysis can be used, e.g. to efficiently navigate the robot out of the border area of an exclusion region S (in the case of a soft wall).

As exemplarily illustrated in FIG. 7C, a virtual force field (schematically represented by the force vectors V) in a virtual exclusion region S that, for example, is always directed toward the closest point of a virtual boundary line B can be taken into consideration. This approach is particularly useful for quickly directing the robot out of an exclusion region S if, due to an imprecisely known robot position, the robot has entered the region. In addition to this, the force field can be made so large that the robot, when the position is precisely known, will not enter the exclusion region. For example, it can be made to correspond to that of a real obstacle, ensuring that a collision with the obstacle will be effectively avoided.

A further approach is based on the cost that a planned path of the robot incurs, wherein the path with the lowest cost will be chosen for controlling the robot. When, for example, a movement of the robot in an exclusion region S "costs" a certain constant amount per a certain travelled distance and movement outside of the exclusion region S does not incur any cost, this will cause the shortest path leading out of the exclusion region S to be selected in order to minimize the cost. Thus, the robot will choose the shortest path leading out of the exclusion region in order to keep the "cost" to a minimum. The term "cost" should be understood metaphorically in this contest as well and could also be referred to as weighting factor.

FIG. 7D exemplarily illustrates the progression of a cost function for a path leading into a virtual exclusion region S. For the path outside of the exclusion region S, no cost incurs. A base cost CO can incur for moving over the virtual boundary B. After this the cost rises proportionally to the length of the travelled path. Of course, other cost functions may be used as well. If it is not possible to plan a path that costs less than a previously specified maximum value Cm, the robot can be stopped and set into an emergency stop status, for example. By these means, the above described division of the virtual exclusion region S into two sub-regions is implicitly achieved.

It should be noted that, by applying the approaches described above, the virtual boundary B can function as a soft wall. Typical of a soft wall is that its border is not hard but, similar to a rubber band, flexible. As opposed to this, a hard wall, just like a real obstacle, would not be possible to travel over (as, in the case of a real obstacle, a collision would result), nor would this be provided for, and the robot would immediately stand still. In terms of the aforementioned cost-based approach this means that if the cost of a planned path that breaches the virtual boundary B is lower than the costs of all other possible movements of the robot, the virtual boundary B may be crossed and thus the exclusion region (partially) travelled over. If, for example, the base cost CO for moving over the virtual exclusion region S is as large as or larger than the maximum value Cm, the planned movement over the exclusion region will not be permitted. If, as shown in FIG. 7D, the base cost CO for moving over the virtual exclusion region S is smaller than the maximum value Cm, moving over the exclusion region will be permitted. This may be necessary, for example, if the robot becomes stuck between two obstacles or there is too little space between an obstacle and the virtual boundary B for it to access an area beyond the obstacle. In the case of a "hard" virtual wall, every movement within the virtual exclusion region incurs maximum costs, which means that no movement in the exclusion region behind the hard virtual wall is possible.

In a further embodiment, the robot 100 stands still after testing has revealed that the robot 100 is located in a virtual exclusion region S. The user is informed of the error and is asked to decide whether the robot should remain still at that position until a user can move it to a different position, or whether the robot should exit the exclusion region S. The user can specify or suggest a path out of the exclusion region S (e.g. by means of the HMI 200). To do so the user can directly (remotely) control the robot or, for example, can specify points of the path or a general direction, on the basis of which the robot is automatically controlled to exit the virtual exclusion region S. For example, the user can specify the virtual boundary B over which the robot is controlled to move when exiting the exclusion region S. This may be useful when a region can be exited over various virtual boundaries. For this purpose a current map can be shown to the user. In addition, the robot may have, for example, a camera that sends its images to the human-machine interface 200, enabling the user to indicate a safe path leading out of the virtual exclusion region based on these images.

Robot's call for help—If the robot unintentionally enters a virtual exclusion region S. and none of the possible ways of exiting the exclusion region S described above are given, it stands still (emergency stop) and awaits user intervention in order to avoid any undesired behavior. The same applies to situations in which the robot cannot liberate itself on its own or in which the robot can no longer move. For example, a user may unintentionally confine the robot in a room (by closing the door to the room while the robot is carrying out a task), thus preventing the robot from autonomously returning to its base station after completing the task. Further examples include; the robot becoming entangled in cables lying on the floor, one of the robot's actuators, such as a rotating brush, becoming blocked, the robot becoming stuck between two obstacles, when continuation of a movement risks a fall over a ledge, when sensors relevant for the functioning of the robot provide inadequate data, or no data at all, due to dirtied sensors, as well as many other safety relevant situations.

It is common to set the robot's status to a special modus such as "emergency stop" in order to distinguish this from a normal pause or the stopping of a work process that may be desired by the user. The internal robot status "emergency stop" means that all actuators (in particular the work unit 160 and the drive unit 170) are stopped and can only be reactivated by means of (e.g. manual) user intervention. One way the user can intervene, for example, is to send a command (e.g. by means of the HMI 200) to the robot as to how it should liberate itself out of the situation. In some cases it may be necessary for the user to intervene manually, for example, to clean a sensor or to release a blocked actuator.

An HMI 200 (or another external device 300) can call up the status of the robot via the communication unit 140 and inform the user of the problem. In addition to this, while the robot is in the "emergency stop" status it can emit an acoustic and/or optical emergency signal, enabling the user to find and liberate the robot more quickly.

Nevertheless the problem may arise that the robot 100 continuously emits a signal while the user is not at home, causing the battery to quickly run down. By the time the user arrives home, the battery may have been depleted to the extent that the robot has turned itself off and stopped emitting the signal. Furthermore, neighbors may feel disturbed by the continuously sounding acoustic signal. Finally, a user may be at home but may not have the time to deal with the robot's problem. A continuous signal would also be disturbing in such a situation.

For these reasons it is expedient to (only) emit the emergency signal when the user is interested in the device. Thus, the acoustic and/or optical signal can be sent out when the status of the robot is called up via an external device 300 (e.g. HMI 200) if the robot has been set to the above described "emergency stop" status. The status can be called up, for example by means of an app in a smartphone or tablet PC. In particular, a robot status request can be made automatically every time the program is started. Alternatively, the app may have a menu item that can be selected to request information regarding the robot's status. Further, the robot can be configured to send a push message to the HMI 200 via the server 502.

For example, the emergency signal can be emitted for a specifiable period of time when the robot recognizes the problem and sets its status to "emergency stop" so that a user in the area can help the robot. Then, if after, for example, five minutes, no help arrives, the robot would enter an energy saving modus (e.g. turning off all sensors and actuators with the exception of the communication unit 140) until a status request sent to the robot 100 via an external device 300.

A smartphone or tablet PC can easily be carried by the user, which allows for a worldwide monitoring and control of the robot (e.g. via Internet). However, if the user is not at home when the status of the robot 100 is requested, it makes little sense for the robot to emit an emergency signal. Therefore, when deciding whether or not to emit an emergency signal, the location of the device making the request, and hence the location of the user, is taken into consideration. An emergency signal will thus only be sent out, for example, if the device making the status request is located within or near the area of robot deployment. The robot 100 can determine the location of the external device (e.g. of the HMI 200) based on various data. For example, the robot can an send an query to the external device and the external device sends a response message that indicates whether the external device is located within the area of robot deployment. The external device can be configured to determine its own location by means of a GPS sensor. However, the SSID (service set identifier) of the WLAN that the external device is logged in to can also provide an (approximate) indication of the location of the external device. Instead of sending a query, the robot can also be configured to detect on its own whether the external device is nearby. For example, the robot 100 can determine whether it and the external device are logged in to the same WLAN. If that is the case, then the robot may assume that the external device (and thus the user as well) are in the close proximity and can emit the emergency signal. In the examples described here, the emergency signal is (e.g. an optical or acoustic) signal that the robot can generate on its own and that can be directly perceived by the user (without the aid of technical devices).

The portable external device can, for example, determine its own location and inform the robot thereof. This is carried out, for example, by means of a satellite-supported global positioning system such as GPS on the basis of information regarding a mobile communications network, or based on WLAN information. In particular when the HMI 200 is directly accessible via a local WLAN with which the robot is also connected is this a good indication that the user is at home.

The robot can also determine whether the user is at home or not by determining whether the status request has come from a local network, such as a home WLAN, or was transmitted via Internet. A communication connection via Internet is usually provided by a cloud service (cf. FIG. 1, server 502) and is so easily distinguished from a local connection. An emergency signal, for example, can be emitted when a status request is received via a local network, whereas in the case of a status request via Internet, this is not done.

Further, additional sensors can be used to detect the presence of a user. For example, the robot can record sound from the environment using an integrated microphone, from which it can be inferred whether the user is at home, enters or leaves the house. Numerous other external sensors and devices may possess information about the presence or absence of the user and can share this information with the robot. For example, an electronic door lock and/or a connected alarm system can inform the robot of when it is activated or deactivated by the user.

Although various embodiments have been illustrated and described with respect to one or more specific implementations, alterations and/or modifications may be made to the illustrated examples without departing from the spirit and scope of the appended claims. With particular regard to the various functions performed by the above described components or structures (units, assemblies, devices, circuits, systems, etc.), the terms (including a reference to a "means") used to describe such components are intended to correspond—unless otherwise indicated—to any component or structure that performs the specified function of the described component (e.g., that is functionally equivalent), even if it is not structurally equivalent to the disclosed structure that performs the function in the herein illustrated exemplary implementations of the invention.

The invention claimed is:

1. A method for controlling an autonomous mobile robot that is configured to autonomously navigate in an area of robot deployment using sensors and map data,
    wherein the map data contains at least one virtual boundary line that has an orientation allowing to distinguish a first side and a second side of the boundary line,
    wherein, when navigating the robot, crossing the boundary line in a first direction coming from the first side of the boundary line is avoided, and
    wherein, when navigating the robot, crossing the boundary line in a second direction coming from the second side of the boundary line is permitted.

2. The method in accordance with claim 1,
    wherein the at least one virtual boundary line is only temporarily contained in the map data for the purpose of delineating, during a deployment of the robot, a region of the area of robot deployment that is to be processed from the rest of the area of robot deployment, and
    wherein the orientation of the at least one virtual boundary line is such that the robot can enter the region to be processed but can no longer exit it.

3. The method in accordance with claim 1,
    wherein the robot uses an obstacle avoidance strategy for navigating that takes into consideration the at least one virtual boundary line in the same way as the contour of an obstacle detected by the sensors of the robot when the robot finds itself on the first side of the boundary line.

4. The method in accordance with claim 1,
    wherein the at least one boundary line is formed by an open or closed polygonal line, the position of which is temporarily or permanently saved in the map data, and wherein the at least one virtual boundary line delineates a virtual exclusion region within the area of robot deployment.

5. The method in accordance with claim 1,
    wherein the boundary line runs at a defined distance to a detected contour of a real obstacle, so that the robot does not come closer to the obstacle than the defined distance.

6. The method in accordance with claim 5,
    wherein a position of the boundary line is saved as a relative position relative to the real obstacle.

7. A method for controlling an autonomous mobile robot that is configured to autonomously navigate in an area of robot deployment using sensors and map data, wherein the robot determines its position on the map and wherein the map data incudes at least one virtual exclusion region; the method comprising:
    testing, based on the information included in the map, whether the robot is at least partially located in the at least one virtual exclusion region,
    wherein, if the test reveals that the robot is located in the at least one virtual exclusion region, the robot decides, based on specifiable criteria, whether to stand still or to exit the exclusion region,
    wherein the exclusion region is divided into a border area and a core area and the specifiable criteria is whether the robot is located in the core area or the border area.

8. The method in accordance with claim 7, further comprising:
    conducting a global self-localization while the robot is moving through the area of robot deployment, wherein the path travelled by the robot is saved, wherein testing whether the robot is at least partially located in an exclusion region is carried out during or after completion of the global self-localization,
    wherein the robot, once having determined that it is located in the at least one virtual exclusion region, travels back along the saved path at least the distance required to safely exit the at least one virtual exclusion region, or
    wherein the robot, once having determined that it was already located in the at least one virtual exclusion region at the beginning of the self-localization, starts to carry out a previously defined task in the exclusion region.

9. The method in accordance with claim 7, wherein one or more localization hypotheses is(are) formulated regarding the current location of the robot, and wherein it is determined for every localization hypothesis whether it is located in the at least one virtual exclusion region or near the at least one virtual exclusion region, and
    controlling the robot such that it exits the exclusion region or increases its distance to it.

10. The method in accordance with claim 7,
    wherein the robot, after having decided to exit the exclusion region, navigates out of the exclusion region by means of a force field analysis.

11. The method in accordance with claim 1, wherein the at least one virtual boundary line is formed by an open or closed polygonal line, the position of which is temporarily or permanently saved in the map data, and wherein the at least one virtual boundary line, together with the contours of one or more real obstacles contained in the map data, delineates a virtual exclusion region within the area of robot deployment.

* * * * *